(12) United States Patent
Carcaterra et al.

(10) Patent No.: US 9,791,017 B2
(45) Date of Patent: Oct. 17, 2017

(54) VEHICLE SUSPENSION WITH ADJUSTMENT OF VIBRATION DAMPING FORCE

(71) Applicant: Universita' Degli Studi Di Roma "La Sapienza", Rome (IT)

(72) Inventors: Antonio Carcaterra, Rome (IT); Gianluca Pepe, Rome (IT)

(73) Assignee: Universita' Degli Studi Di Roma "La Sapienza", Rome (IT)

(*) Notice: Subject to any disclaimer, the term of this patent is extended or adjusted under 35 U.S.C. 154(b) by 0 days.

(21) Appl. No.: 15/114,046

(22) PCT Filed: Jan. 28, 2015

(86) PCT No.: PCT/IB2015/050648
§ 371 (c)(1),
(2) Date: Jul. 25, 2016

(87) PCT Pub. No.: WO2015/114536
PCT Pub. Date: Aug. 6, 2015

(65) Prior Publication Data
US 2016/0348749 A1 Dec. 1, 2016

(30) Foreign Application Priority Data
Jan. 28, 2014 (IT) .............................. RM2014A0040

(51) Int. Cl.
*B60G 15/06* (2006.01)
*F16F 15/027* (2006.01)
(Continued)

(52) U.S. Cl.
CPC .......... *F16F 15/0275* (2013.01); *B60G 13/18* (2013.01); *B60G 15/06* (2013.01);
(Continued)

(58) Field of Classification Search
CPC ...... B60G 13/18; B60G 17/015; B60G 17/08; B60G 17/033; B60G 2204/162;
(Continued)

(56) References Cited

U.S. PATENT DOCUMENTS 4,154,461 A 5/1979 Schnittger
5,337,864 A * 8/1994 Sjostrom ................ B60G 13/18
188/266.2

(Continued)

FOREIGN PATENT DOCUMENTS

DE 102007048194 4/2009
EP 0501115 9/1992
WO WO9202382 2/1992

OTHER PUBLICATIONS

Michael Valasek and Willi Kortum, "Semi-Active Suspension Systems II", CRC Press LLC, 2002, 18 pages.
(Continued)

*Primary Examiner* — Thomas G Black
*Assistant Examiner* — Ce Li
(74) *Attorney, Agent, or Firm* — Stetina Brunda Garred & Brucker

(57) ABSTRACT

A device for connecting the elastic elements and dissipaters of variable type of a mechanical suspension interposed between two vibrating or tilting mechanical systems, the source body and the receiving body, respectively, in order to reduce the forces acting on the receiving body, and/or the displacement thereof, and/or the speed thereof, or combinations of the previous physical magnitudes and/or of any other ones, which are produced on the receiving body due to the motion or forces to which the source is subjected. The device consists of elastic elements, such as metal components or compressed gases, energy dissipating elements, either by means of friction between fluid and solid, and between solid and solid, or by means of suitable electro-
(Continued)

magnetic couplings the damping ability of which can be automatically varied by a suitable control system according to the operating conditions of the suspension; elements forming the kinematic connection structure between the elastic elements, damping elements, source and receiving bodies, such connections being solid or fluid or electromagnetic connections.

16 Claims, 34 Drawing Sheets

(51) Int. Cl.
*F16M 7/00* (2006.01)
*B60G 13/18* (2006.01)
*B60G 17/015* (2006.01)
*B60G 17/033* (2006.01)
*B60G 17/08* (2006.01)
*F16F 9/53* (2006.01)
*F16F 15/02* (2006.01)
*F16F 9/32* (2006.01)
*B63B 17/00* (2006.01)
*B64C 25/60* (2006.01)

(52) U.S. Cl.
CPC ......... *B60G 15/065* (2013.01); *B60G 17/015* (2013.01); *B60G 17/033* (2013.01); *B60G 17/08* (2013.01); *B63B 17/0081* (2013.01); *B64C 25/60* (2013.01); *F16F 9/3292* (2013.01); *F16F 9/532* (2013.01); *F16F 9/535* (2013.01); *F16F 15/022* (2013.01); *F16M 7/00* (2013.01); *B60G 2202/312* (2013.01); *B60G 2202/314* (2013.01); *B60G 2202/32* (2013.01); *B60G 2202/322* (2013.01); *B60G 2500/10* (2013.01); *B60G 2500/22* (2013.01)

(58) Field of Classification Search
CPC ........ B60G 2300/082; B60G 2202/312; B60G 2202/314; B60G 2202/32; B60G 2202/322; B60G 2500/10; B60G 2500/22; B60N 2/502; B60N 2/505; B60N 2/501; F16F 9/3292; F16F 9/532; F16F 9/535; F16F 15/022; F16F 15/0275; B63B 17/0081; B64C 25/60; B62D 33/0608; F16M 7/00
See application file for complete search history.

(56) References Cited

U.S. PATENT DOCUMENTS

| | | | |
|---|---|---|---|
| 7,921,973 B2 * | 4/2011 | Wereley | B60N 2/4242 188/266 |
| 2005/0242532 A1 | 11/2005 | Deo et al. | |
| 2008/0156602 A1 * | 7/2008 | Hiemenz | B60N 2/4242 188/267.1 |
| 2009/0125194 A1 * | 5/2009 | Haller | B62D 33/0608 701/48 |
| 2015/0343874 A1 * | 12/2015 | Kurata | B60G 17/0195 701/29.1 |

OTHER PUBLICATIONS

D. Karnopp, M.J. Crosby and R.A. Harwood, "Vibration Control Using Semi-Active Force Generators", Journal Df Engineering for Industry, May 1974, pp. 619-626.

* cited by examiner

VEHICLE SUSPENSION WITH ADJUSTMENT OF VIBRATION DAMPING FORCE

CROSS REFERENCE TO RELATED APPLICATIONS

The present application claims priority to PCT International Application No. PCT/IB2015/050648 filed on Jan. 28, 2015, which application claims priority to Italian Patent Application No. RM2014A000040 filed Jan. 28, 2014, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The invention relates to suspension systems, in particular for vehicles, which have feature adjusting means.

BACKGROUND ART

Suspensions are devices interposed between two vibrating or tilting mechanical systems, herein referred to as source body, e.g. wheels, and receiving body, e.g. a vehicle cabin, respectively, in order to reduce the forces acting on the receiving body, and/or the displacement thereof, and/or the speed thereof, or combinations of the previous physical magnitudes and/or of any other ones, which are produced on the receiving itself due to the motion or forces to which the source is subjected.

It is widely known that they are arranged in particular between the wheels of the vehicles and the structures of the vehicles used for loading goods or passengers, aiming at avoiding that impacts or vibrations generated during the movement are transmitted to the entire vehicle.

In order to improve the adaptation ability of the suspensions to the various loading and speed conditions, several systems have been manufactured, comprising elastic elements, e.g. metal components, compressed gases, energy dissipating elements, either by means of friction between fluid and solid, and between solid and solid, or by means of suitable electromagnetic couplings the damping ability of which can be automatically varied by a suitable control system according to the operating conditions of the suspension.

A type of suspension giving good results is the sky-hook and ground-hook type devices described in D. Karnopp, M. J. Crosby and R. A. Harwood. (1974). Vibration Control Using Semi-Active Force Generators. *Journal of Engineering for Industry*, 96(2): 619-626 and in Valasek, M. and Kortüm W. (2002). Semi-Active Suspension Systems II. *The Mechanical Systems Design Handbook*. CRC Press LLC. They achieved considerable technical and commercial success in the field of semi-active damping control in vibrating systems. The most apparent advantage of these systems is that they are devices having a semi-active operation, i.e. characterized only by the possibility to change their dissipation abilities without a significant external energy supply, hence ensuring constructional simplicity, low costs, reduced weight and size.

A solution providing for a suspension where the features of damping, stiffness and stroke between a vehicle wheel and chassis can be adjusted independently of one another is disclosed in the publication US2005242532A1. However, the ability of this solution to react to impacts and vibrations is limited and does not respond properly to vibrations with a higher frequency.

However, such suspensions leave room for further improvement in the damping performance and flexibility of using the suspensions in wider fields than the vibrating structures. Therefore, a need is felt to manufacture a novel suspension which has superior performance compared to that of the prior art and improves the damping effects on the receiving structure.

SUMMARY OF THE INVENTION

It is the main object of the present invention to provide an innovative suspension which can also be applied in fields other than those of vehicles and which can be adjusted in its vibration damping force in all the applications thereof.

Therefore, in a first aspect, the present invention aims to achieve the objects discussed above by implementing, according to claim 1, a suspension adapted to damp the vibrations generated by a vibrating source body SS on a receiving body SR, comprising
  a first energy dissipation system comprising at least one first energy dissipater DC1 with controllable dissipation force and at least one first elastic element EL1,
  a second energy dissipation system comprising at least one second energy dissipater DC2 with controllable dissipation force and at least one second elastic element EL2,
  at least one intermediate body SI,
  an electronic control device,
  at least one first sensor SC1 which can be associated with the receiving body SR, at least one second sensor SC2 which can be associated with the source body SS and at least one third sensor SC3 associated with the at least one intermediate body SI, to detect instantaneous physical parameters of source body SS, of receiving body SR and of the at least one intermediate body SI,
  wherein the electronic control device CC can be operated as a function of a control strategy which takes said instantaneous physical parameters into account to control the damping forces of said first and second energy dissipation systems in a combined manner,
  wherein the at least one first DC1 and the at least one second DC2 energy dissipaters, the at least one first elastic element EL1 and the at least one second elastic element EL2 are connected between source body SS and/or receiving body SR and/or at least one intermediate body SI, so that only the adjustment of the damping forces generated by said at least one first DC1 and at least one second DC2 energy dissipaters modifies:
  the static stiffness of the suspension itself,
  the transmission curve of the suspension by varying both the peak frequencies and the associated amplitude thereof,
  the instantaneous elastic forces produced by the at least one first EL1 and second (EL2) elastic elements,
  in order to optimize the motion features of the receiving body SR,
  wherein the receiving body SR is an upper part PSUP, the source body SS is a lower part PINF.
  wherein the at least one first energy dissipater DC1 is connected between the upper part PSUP and the at least one intermediate body SI, the at least one second energy dissipater DC2 is connected between the at least one intermediate body SI and the lower part PINF, the at least one first elastic element EL1 is connected between the upper part PSUP and the lower part PINF, and the at least one second elastic element EL2 is connected between the upper part PSUP and the at least one intermediate body SI.

In a second aspect, the invention achieves the above-mentioned objects by a method of controlling the features of the above-described suspension, comprising the stages of:

detecting predetermined physical parameters by means of sensors, sending signals corresponding to said physical parameters to the control unit, calculating the values of at least two control signals to be sent to amplifiers by means of an algorithm which includes examining said signals, and calculating the best combination of the adjustment signals $s_{DC1}$, $s_{DC2}$ of the dissipater elements (DC1, DC2) chosen from the following combinations:

| | |
|---|---|
| Combination 1: | $c_{DC1}$ → minimum value |
| | $c_{DC2}$ → minimum value |
| Combination 2: | $c_{DC1}$ → minimum value |
| | $c_{DC2}$ → maximum value |
| Combination 3: | $c_{DC1}$ → maximum value |
| | $c_{DC2}$ → minimum value |
| Combination 4: | $c_{DC1}$ → maximum value |
| | $c_{DC2}$ → maximum value | where $c_{DC1}$ is the damping coefficient of the first dissipater element and $c_{DC2}$ is the damping coefficient of the second dissipater element, to minimize or maximize the absolute and/or relative acceleration and/or speed and/or position of the receiving system.

In particular, in the preferred embodiments, the suspension is provided with two or more dissipaters, the dissipation feature of which is adjustable, for example by using magnetorheological fluids having their resistance to a forced flow between suitable orifices is adjustable through the magnetic field generated by suitable circuits, the circulating current of which is changed.

A further possibility of adjustment is carried out by changing the section surface of the orifices through which the fluid is forced to flow, which change is obtained by means of electromechanical actuators.

A special feature of the invention is that the essential parts of the suspension comprise at least two dissipaters and at least two elastic elements and that they are suitably connected together and to the source and receiving bodies and the advantages of the invention are achieved independently of the connection schemes chosen from those possible. It is also important that an intermediate body is also suitably arranged in all the possible connection schemes of the elements forming the suspension.

The connection schemes of the essential elements of the suspension of the invention can be grouped according to three types.

The first type of scheme is defined as a series module and is shown in FIG. 37. This module consists of an upper part PSUP, a lower part PINF, an intermediate part SI and at least two dissipaters DC1 and DC2, one connected between PSUP and SI and the other one between SI and PINF, and at least two elastic elements EL1 and EL2 connected in the following three combinations, one between PSUP and SI, the other between PINF and SI, or one between PSUP and PINF, the other between PINF and SI, or one between PSUP and PINF, the other between PSUP and SI.

The suspension schemes referring to the series module are shown in FIGS. 9, 17, 28.

The second type of scheme is the parallel module, which is shown in FIG. 38. It consists of an upper part PSUP, a lower part PINF, an intermediate part SI and at least two dissipaters DC1 and DC2, one connected between PSUP and SI and the other between PSUP and PINF, and at least two elastic elements EL1 and EL2, one connected between PINF and SI and the other in the following two combinations, between PSUP and PINF or between PSUP and SI.

The schemes referring to the parallel module are shown in FIGS. 1, 6, 23.

The third type of scheme is referred to as the tilting module, which is shown in FIG. 39, consisting of an upper part PSUP, a lower part PINF and an intermediate part SI rotating about the hinge CERXC (tilting motion) and at least two dissipaters DC1 and DC2 inserted in the device in one of the following combinations: between PSUP and PINF, and/or between PINF and CERXC, and/or between CERSD and CERXD, and/or between CERSS and CERXS, and consisting of at least two elastic elements EL1 and EL2 inserted in the device in one of the following combinations: between PSUP and PINF, and/or between PINF and CERXC, and/or between CERSD and CERXD, and/or between CERSS and CERXS, in which the references CERSS, CERSD, CERXS, CERXD, CERXC indicate hinges.

Among these embodiments, a particularly advantageous one is that shown in FIG. 39a, the at least one first energy dissipater DC1 is connected to the upper part PSUP by a first hinge CERSS and to the intermediate body SI by a second hinge CERXS, the at least one second energy dissipater DC2 is connected to the intermediate body SI by a third hinge CERXC, and the at least one second elastic element EL2 is connected to the intermediate body SI by a fourth hinge CERXD and to the upper part PSUP by a fifth hinge CERSD. The embodiment in FIG. 12 also includes a third dissipater DC3 and a third elastic element EL3, both connected between the upper part PSUP and the lower part PINF by respective hinges.

The schemes proposed in the present invention and referring to the tilting module are shown in FIGS. 12, 15, 19.

In the schemes in FIGS. 37, 38, 39, the possible positions of the at least two elastic elements EL and of other possible dissipaters DC are indicated by dash-dot-dot lines.

Some alternative schemes according to the invention with other possible arrangements of the suspension elements are shown in FIGS. 26 and 27, including two intermediate bodies SI and at least two dissipaters DC and at least two elastic elements EL.

According to the invention, the intermediate system SI, which is present in all the connection schemes, is a necessary component of the suspension representing a connection element connecting at least two dissipaters DC and at least two elastic elements EL together and concurring to serve the function of changing the suspension stiffness.

In some embodiments of the suspension of the invention, the intermediate body SI consists of a rigid, movable body as depicted in FIGS. 4, 5, 7, 8, 11, 13, 18, 20, 21, 29, 31, 32, 35; in other embodiments, it consists of the fluid mass passing from a chamber to the other, as in the cases depicted in FIGS. 10, 14, 16, 36, and in other variants, it consists of the current flowing in an electric circuit, as depicted in FIGS. 23, 24, 25, or alternatively it consists of gas.

It shall be apparent to those skilled in the art that, in the suspension arrangement schemes according to FIGS. 37, 38 and 39, the lower part PINF can be both a source system SS and a receiving system SR, while in the suspension arrangement schemes according to FIGS. 37, 38 and 39, the lower part PSUP can be either a source system SS or a receiving system SR.

In the suspension of the invention, a damping force generated by electromagnetic couplings which use the Lorentz force can also be exploited, by making the magnetic field generated by coils or permanent magnets to interact with suitably controlled variable currents.

In accordance with the invention, the suspension further provides for the adjustable dissipater elements being connected to the elastic elements and to the source and receiving systems, and for the adjustment being controlled by a control system with the possibility to change the damping ability and stiffness of the suspension by controlling the dissipation force in the two or more dissipater elements with which the suspension is provided.

In particular, the control system allows two limit static stiffnesses to be obtained in the suspension always, a maximum one and a minimum one, corresponding to the different resistance adjustments of the at least two dissipater elements. In some embodiments of the suspension of the invention, in which two variable dissipaters are used, the control system generally obtains in the suspension four different levels of static stiffness, corresponding to the combination of two possible limit adjustments for each of the two dissipater elements.

In fact, each of the dissipaters can have the two ideal limit adjustments: a complete obstruction of the orifices, or a complete opening of such orifices. In the first case, the dissipator has an infinite resistance, and it becomes a rigid connection; in the second case, the dissipater can offer an ideally null resistance, and thus it is a completely inactive element within the connection scheme.

The embodiments of the suspension can use various elastic means, such as for example coil springs, membrane springs, gas-driven springs, connected together by fluids, liquids or gases, pistons and/or partitions provided with orifices having a controllable flow resistance, cylinders and interconnected chambers.

The suspension control system can be operated to change the adjustment of the dissipation of the dissipaters depending on the motion of the source, the receiving body and/or other movable parts of the suspension, in particular depending on the acceleration or other magnitudes measured by suitable sensors of the several components of the suspension itself, which are integral with source and receiving bodies and/or other parts of the suspension, respectively.

Furthermore, an accelerometer can be used, which is integral either with the source and/or the receiving body, and a relative position sensor (e.g. of the resistive type), the ends of which are connected to the source and the receiving bodies. The signals acquired by the sensors are transmitted to an electronic control unit which determines the adjustment of the two dissipaters according to a predetermined mathematic algorithm.

In particular, in a particularly advantageous embodiment, in which the dissipation is adjusted by using magnetorheological fluids, the control system of the suspension determines the currents which must be delivered to the electric circuits which generate the magnetic field close to the orifices.

Some control laws implemented by the suspension control system provide the desired level of dissipation in each of the two dissipaters as a function of the signals of acceleration or other nature sent to the control unit, so as to optimize the suspension operation.

The suspension can be applied in wheeled vehicles, where it is interposed between the vehicle wheels and chassis.

It can be employed in marine vehicles, where this system is interposed between suitable hydrodynamic surfaces, referred to as strakes, which cut through the water surface, thus creating a supporting effect for the craft and the body of the marine vehicle itself, thus allowing the vehicle to move at a high speed onto the water surface even in the presence of waves, and mitigating the effects of the violent accelerations produced on the strakes by the wave motion and allowing the vehicle body to maintain the desired attitude.

Again, the system can be employed to mitigate the impact effects of the surfaces of a planing hull thus reducing the shock effects on impacting structures and connection structures.

Again, the present invention can be employed for improving the landing behavior of aircraft landing gears when the wheel hits the runway and transmits a violent shock to the body of the aircraft itself. The suspension system of the present invention allows to mitigate the accelerations and forces transmitted to the fuselage, hence to the cabin and occupants thereof.

Such a type of suspension can also be used on board of a vehicle for isolating a seat against the vibrations transmitted by the structure on which it is anchored, for example, in the implementation referred to as isolating anchor.

Due to its ability of particularly rapidly adjusting the feature thereof, such a suspension can be interposed between a motor and the structure on which it is mounted in order to mitigate the vibrations transmitted during its operation, again in this case in the application referred to as isolating anchor.

The suspension of the invention is not limited in its applications only to vehicles. It can also be used for mitigating the vibrations transmitted by an industrial machinery which vibrates on the ground, or for isolating against the base vibrations of special, fragile devices positioned on its surface, again according to the preferred embodiment of an isolating anchor.

The present invention can possibly be applied in antiseismic civil structures by interposing it between two structural elements of the frame and foundation elements.

The suspension object of the present invention has further important advantages compared to a suspension according to the sky-hook system in which, in fact, there is only a controllable dissipater element which modifies the instantaneous damping of the suspension system instant by instant. Instead, in the suspension according to the invention, two or more dampers are used, which can be controlled by the control system and suitably inserted in the suspension system: the combined adjustment thereof results, by virtue of a synergic effect, in the modification of both the damping and the stiffness, achieving this result only by means of changes in the suspension damping. This particular control of the dissipating elements allows at least two distinct levels of static stiffness to be achieved for the suspension, and still more advantageously, up to four distinct levels of static stiffness to be achieved if two controllable dampers are used. The effect produced by the dissipater adjustment on the suspension system can be discussed according to various viewpoints. A first effect occurs at the limit adjustments of the dissipaters, i.e. of their maximum and minimum possible resistance. The minimum, ideally null resistance (corresponding to a null resistance of the orifices) and the maximum, ideally infinite resistance (corresponding to the complete obstruction of the orifices), produce different and definable values of the suspension static stiffness.

Moreover, for all the intermediate adjustments between the thresholds, the transmission features of the suspension can also be defined as the frequency varies, the patterns of which are still variable as a function of the above-mentioned adjustments, and in particular the resonance peaks are changed, again due to the adjustments. Finally, a last and important effect, directly exploited by the control system described in the present invention, allows the forces transmitted instantaneously by the source to the receiving system to be modified, since the adjustment of the two (or more) dissipaters depends on the motion features of the source and receiving systems and/or of other parts of the suspension.

Therefore, by means of a dissipater element with variable dissipation, an effect of instantaneous modification of the natural frequency of the suspension can be produced, thus giving the suspension itself the ability to displace the latter in the most efficient manner with respect to the band of exciting frequencies deriving from the source perturbations, i.e. the road surface, or the water surface, or the airstrip, or the excitation of the base in case of industrial and civil applications.

BRIEF DESCRIPTION OF THE DRAWINGS

Further features and advantages of the invention will become more apparent in light of the detailed description of preferred, but not exclusive embodiments of a vehicle suspension, given by way of illustrative, non-limiting example, with the aid of the accompanying drawings, in which.

DETAILED DESCRIPTION OF PREFERRED EMBODIMENTS OF THE INVENTION

The suspension of the invention is described in detail with reference to various schemes indicated by A, B, C, D, E, F, G, H, I, L, M, respectively, for illustration reasons. In all the schemes, there are two or more adjustable dissipater elements connected to the elastic elements, in a number of two or more, and to the source and receiving systems.

Figure 1:
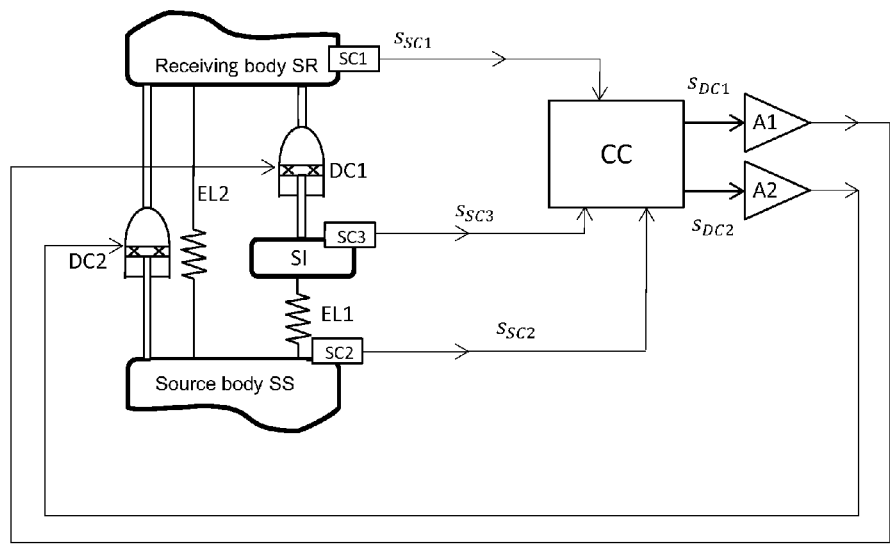
FIG. 1 depicts a scheme of a first embodiment of the suspension of the invention with control system (scheme A)

Scheme A is depicted in FIG. 1. The suspension interposed between source system SS and receiving system SR consists of two variable dissipaters DC1 and DC2, and two elastic elements EL1 and EL2.

As it is known, each variable dissipater element DC is connected to the rest of the suspension through three interfaces: the two mechanical ends ES and EI connectable to other mechanical elements of the suspension, and the signal input "s", typically an electric signal, which according to a physical principle among those known in the art, modifies the force F which is generated by the dissipater between the two mechanical ends ES and EI. In particular, according to studies known in the art, the relationship:

$$F = c(s)(V_{ES} - V_{EI})$$

is given, where c(s) is the damping coefficient of the dissipater, the value of which depends on the signal "s" processed by the control unit CC of the suspension, VES and VEI being the speeds of the upper and lower ends of the dissipater.

In the Scheme in FIG. 1, the elements DC1 and EL1 are connected in series, the elements DC2 and EL2 are connected in parallel. The upper part of the elements DC1, DC2 and EL2 is integrally connected to the receiving body SR. The lower part of the elements EL1, DC2, EL2 is integrally connected to the source body SS.

In the suspension scheme in FIG. 1, some components can be exchanged, for example by replacing DC1 with EL1, and vice versa.

Three sensors belonging to the control unit of the suspension are indicated by SC1, SC2 and SC3, and they are, for example, but not exclusively, accelerometers. The sensors SC1 and SC2 are integral with the receiving and source bodies, respectively. Sensor SC3 is integral with the lower part of dissipater DC1 and with the upper part of the elastic element EL1, which are mutually integral. The signals produced by the sensors SC1, SC2, SC3 are sent to the control unit CC which, according to the algorithm described below, determines the two values of the control signals to be sent to the amplifiers A1 and A2 which send the signals back to the actuators, which change the adjustment of the dissipaters DC1 and DC2.

From the combined adjustment of DC1 and DC2, controlled by the control system of the suspension, three effects are obtained on the suspension.

As regards the first effect, in order to determine the possible static suspension stiffnesses which can be obtained by varying the adjustment of the two dissipaters, four possible limit adjustment combinations of the dissipaters DC1 and DC2 can be considered, to which four values of the static stiffness correspond according to Table 1, where $c_{DC1}$ is the damping of dissipater DC1, $c_{DC2}$ is the damping of dissipater DC2, $k_{EL1}$ is the stiffness of the elastic element EL1 and $k_{EL2}$ is the stiffness of the elastic element EL2.

TABLE 1

Limit adjustment under a static condition related to scheme A in FIG. 1

| DC2 | DC1 Null damping of DC1 ($C_{DC1}$ = 0) | Infinite damping of DC1 ($C_{DC1}$ = ∞) |
|---|---|---|
| Null damping of DC2 ($C_{DC2}$ = 0) | Static stiffness $k_{EL2}$ | Static stiffness $k_{EL1} + k_{EL2}$ |
| Infinite damping of DC2 ($C_{DC2}$ = ∞) | Infinite static stiffness | Infinite static stiffness |

Figure 2:
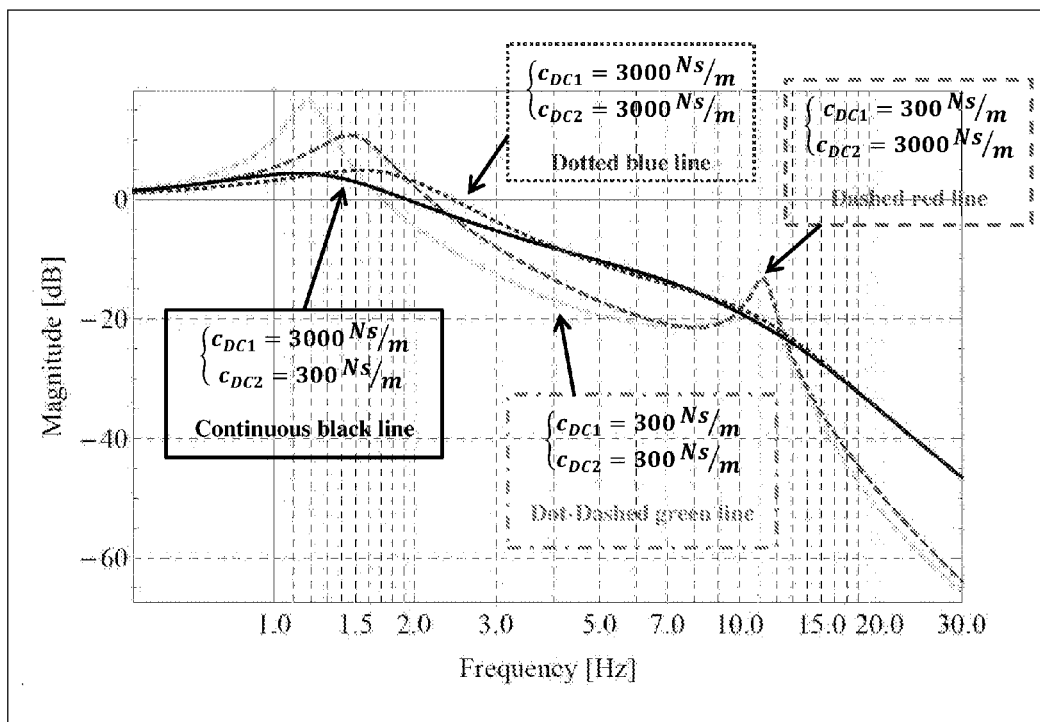
FIG. 2 shows a graph with the transmission curve related to the second effect.

As regards the second effect, a change in the dissipative features of the dampings of dissipaters DC1 and DC2 also allows to vary the stiffness of the system. This means that, unlike the suspension systems of the prior art, where the dynamic response of the system (or better, the transmission curve of the system, i.e. the feature of the suspension system of dynamically transmitting the stresses between the source body SS and the receiving body SR) cannot sensibly change the peak frequency, the suspension of the invention is instead capable of sensibly changing both the peak frequency and the amplitude thereof, as reported in FIG. 2 related to scheme A depicted in FIG. 1. In the graph in FIG. 2, four transmission curves are reported, concerning the dynamic response between the source body SS and the receiving body SR related to four different adjustment combinations for the damping coefficients of the dissipaters DC1 and DC2. The predetermined data for the identification of the transmission curves in FIG. 2 is as follows:

$$m_{SR} = 400 \text{ kg}$$
$$m_{SS} = 50 \text{ kg}$$
$$m_{SI} = 5 \text{ kg}$$
$$k_{EL1} = 25000 \frac{N}{m}$$
$$k_{EL2} = 25000 \frac{N}{m}$$

where $m_{SR}$ indicates the mass of the receiving body, $m_{SS}$ the mass of the source body, $m_{SI}$ the mass of the intermediate body, $k_{EL1}$ the elastic constant related to EL1, $k_{EL2}$ the elastic constant related to EL2, $c_{DC1}$ the damping coefficient established for dissipater DC1 and $c_{DC2}$ the damping coefficient established for dissipater DC2.

The third effect relates to the possibility of an instantaneous control of the damping values of $c_{DC1}(s_{DC1})$ and $c_{DC2}(s_{DC2})$ of the two dissipaters DC1 and DC2, the control mode of which forms part of the present invention. $s_{DC1}$ is the signal s processed by the control unit CC which controls the damping coefficient $c_{DC1}$ of dissipater DC1. $c_{DC2}$ is the signal s processed by the control unit CC which controls the damping coefficient $c_{DC2}$ of dissipater DC2.

All the embodiments of the suspension of the invention can be controlled with control strategies which take into account the instantaneous physical parameters such as absolute position, relative position, absolute speed, relative speed, absolute acceleration and relative acceleration of the source body SS by means of the associated sensor SC1, of the receiving body SR by means of an associated sensor SC2, and of the intermediate body SI by means of sensor SC3.

Figure 3:
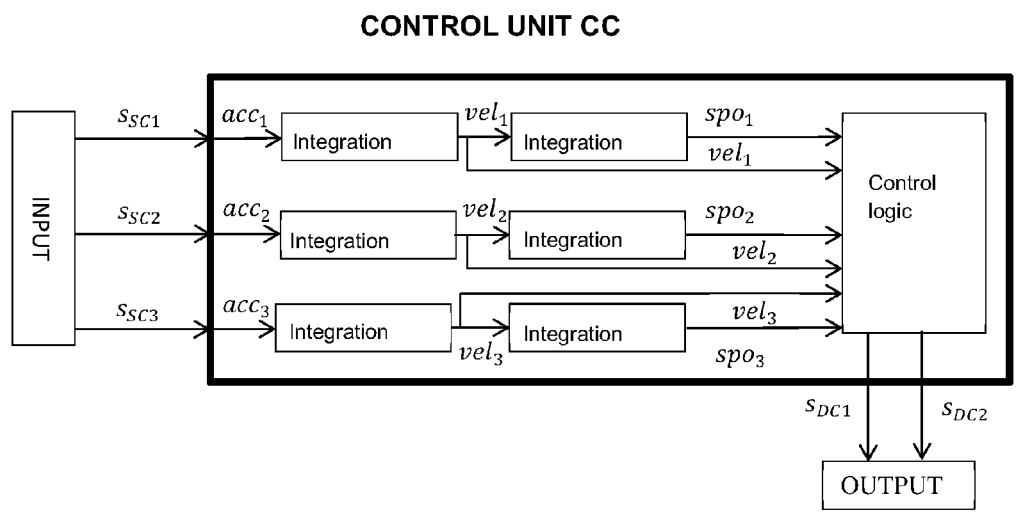
FIG. 3 depicts a scheme of a processing unit belonging to the control system of the suspension in FIG. 1.

The control unit CC generally has the input signals of the sensors SC1, SC2, SC3 connected to source body SS, intermediate body SI and receiving body SR. Such signals can be, for example as depicted in FIG. 3, the absolute acceleration measured by accelerometers, and thus the signals associated thereto can be numerically integrated so as to obtain the speed and displacement required to apply the predetermined control logic. Once the accelerations and/or speeds and/or displacements of the three movable bodies i.e. source SS, receiving SR, intermediate SI, have been obtained or measured, in order to apply the control logic, the control unit CC outputs the signals which control the damping value required by the control algorithm.

By way of illustrative, non-exclusive and non-limiting example, two control laws which can be used to optimally control the dissipaters DC1 and DC2 are described below, which apply to all the embodiments of the suspension.

The first is conventionally referred to as the "Direct Acceleration Control" (DAC), and the second one is referred to as the "Dissipation Energy Rate Control" (DERC).

The control law DAC consists in minimizing the acceleration of the receiving body SR for each instant of data processing by the control unit CC. Such a law consists in an algorithm which cyclically considers the parameters measured by the sensors SC1, SC2, SC3, and once they have been sent to the control unit CC (see example in FIG. 3), outputs the best combination of the signals $s_{DC1}$, $s_{DC2}$ for the adjustment of the dissipaters DC1 and DC2, so that it results in the lowest possible acceleration to the receiving body SR.

The control law DAC consists in selecting from all the possible adjustment combinations of the dissipaters DC1 and DC2, described in Table 2, those which provide the receiving body SR with the lowest acceleration. Both dissipater DC1 and dissipater DC2 can take two ideal extreme statuses of dissipation ability: infinite or null. Several commercially available dissipaters, as those operating by means of a ferrofluid, such as electrorheological or magnetorheological fluids, have the ability to provide said double adjustment between a very high dissipation value and a very low dissipation value.

TABLE 2

Possible combinations for controlling DC1 and DC2 with control logic DAC

| | |
|---|---|
| Combination 1: | $C_{DC1}$ → minimum value |
| | $C_{DC2}$ → minimum value |
| Combination 2: | $C_{DC1}$ → minimum value |
| | $C_{DC2}$ → maximum value |
| Combination 3: | $C_{DC1}$ → maximum value |
| | $C_{DC2}$ → minimum value |
| Combination 4: | $C_{DC1}$ → maximum value |
| | $C_{DC2}$ → maximum value |

The control algorithm is as follows. For example, as regards the scheme A of the suspension, the following physical parameters are measured by means of the sensors:

$V_{SR}$ absolute speed of receiving body SR,
$V_{SS}$ absolute speed of source body SS,
$spo_{SR}$ absolute displacement of receiving body SR
$spo_{SS}$ absolute displacement of source body SS,
$V_{SI}$ absolute speed of intermediate body SI.

The combination of the values in Table 2, which reduces the following absolute-value expression for each instant of the sampling time of the unit CC of the control system:

$$[c_{DC1}*(V_{SR}-V_{SS})+k_{EL1}*(spo_{SR}-spo_{SS})+c_{DC2}*(V_{SR}-V_{SI})]$$

is then taken as the output for the adjustment of the dissipaters DC1 and DC2.

Such a control strategy minimizes the acceleration of the receiving body SR as regards scheme A.

Figure 6:
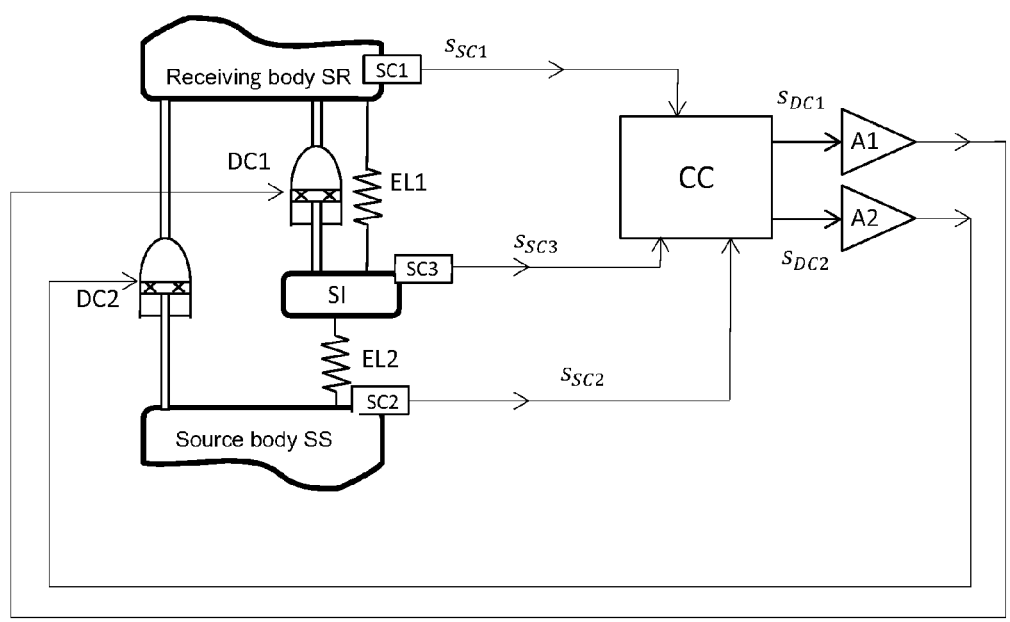
FIG. 6 depicts a scheme of a second embodiment of the suspension of the invention with control system (scheme B)

The same can be obtained for the scheme B reported in FIG. 6. The following physical parameters are measured by the sensors:

$V_{SR}$ absolute speed of receiving body SR,
$V_{SS}$ absolute speed of source body SS,
$spo_{SR}$ absolute displacement of receiving body SR
$spo_{SI}$ a absolute displacement of intermediate body SI,
$V_{SI}$ absolute speed of intermediate body SI.

The combination of the values in Table 2 which minimizes the following absolute-value expression:

$$[c_{DC1}*(V_{SR}-V_{SS})+k_{EL2}*(spo_{SR}-spo_{SI})+c_{DC2}*(V_{SR}-V_{SI})]$$

is then taken as the output for the adjustment of the dissipaters DC1 and DC2.

Such a control strategy minimizes the acceleration of the receiving body SR as regards scheme B.

Instead, the control law DERC is based on measuring and/or calculating the physical parameters of the bodies SS, SR, SI deriving from the data read from the sensors SC1, SC2, SC3, and sent to the control unit CC, but this time by following a different control algorithm which is synthetically reported in Table 3. Such a control law can be used for any embodiment of the suspension of the invention.

TABLE 3

Control algorithm related to strategy DERC

| CASES | CHECK | ACTION | |
|---|---|---|---|
| 1 | $(V_{SR} - V_{SS})V_{SR} \geq 0$ | $C_{DC1}$ → maximum value | |
| | | $C_{DC2}$ → minimum value | |
| 2 | $(V_{SR} - V_{SS})V_{SR} < 0$ | $C_{DC1}$ → maximum value | |
| | | $C_{DC2}$ → minimum value | |

Such a control law takes into account two different cases (see Table 3) which can occur. Case 1, i.e. when there is met the condition in which the product of the receiving body speed $V_{SR}$ by the relative speed $(V_{SR}-V_{SS})$ is greater than or equal to zero, then the control unit CC adjusts dissipater DC1 with the maximum damping value $c_{DC1}$ thereof, whereas for dissipater DC2 with the minimum damping value $c_{DC2}$. If the hypothesis related to case 1 should not be met, then the adjustment proceeds according to the case indicated as 2 (see Table 3).

The DERC algorithm is a very robust control, and it results in a decrease of the acceleration and displacement of both the source body SS and the receiving body SR, without compromising the stroke of the suspension. If it is applied to a suspension system for vehicles, a strong improvement in comfort, together with an improvement in drivability, i.e. grip, are obtained. Such an algorithm comes from a more general control reported in Table 4, referred to as generalized DERC.

TABLE 4

Control algorithm related to the generalized DERC strategy

| CASES | CHECK | DAMPING ADJUSTMENT |
|---|---|---|
| Case 1.1 | EQ1 ≥ 0 | $C_{DC1}$ → maximum or minimum value |
| Case 2.1 | EQ1 < 0 | $C_{DC1}$ → maximum or minimum value |
| Case 1.2 | EQ2 ≥ 0 | $C_{DC2}$ → maximum or minimum value |
| Case 2.2 | EQ2 < 0 | $C_{DC2}$ → maximum or minimum value |

The expressions EQ1 and EQ2 to be considered in the generalized DERC control are as follows:

$$\begin{cases} EQ1 = (\alpha_1 * V_{SR} + \alpha_2 * V_{SI})(\alpha_3 * V_{SI} + \alpha_4 * V_{SS})(\alpha_5 * V_{SR} + \alpha_6 * V_{SS}) \\ EQ2 = (\beta_1 * V_{SR} + \beta_2 * V_{SI})(\beta_3 * V_{SI} + \beta_4 * V_{SS})(\beta_5 * V_{SR} + \beta_6 * V_{SS}) \end{cases}$$

Where the parameters $\alpha_i$ and $\beta_j$ can be fixed by choice according to the values 0 or 1 or −1 as follows:

$$\alpha_i = \begin{cases} 0 \\ 1 \quad (i = 1, \ldots, 6) \\ -1 \end{cases}$$

$$\beta_j = \begin{cases} 0 \\ 1 \quad (j = 1, \ldots, 6) \\ -1 \end{cases}$$

Once the coefficients $\alpha_i$ and $\beta_j$ have been fixed, the desired type of adjustment in terms of damping of the dissipaters DC1 and DC2, respectively, is then determined. For example, another control law DERC, referred to as DERC2, can be obtained if $\alpha_1=1$, $\alpha_5=1$, $\alpha_6=-1$, $\beta_1=1$, $\beta_3=1$, $\beta_4=-1$ and the other coefficients are fixed at zero, the law reported in Table 5 is followed.

TABLE 5

Control algorithm DERC2 of the generalized DERC strategy

| CASES | CHECK | ADJUSTMENT OF THE DISSIPATERS |
|---|---|---|
| Case 1.1 | $(V_{SR} - V_{SS})V_{SR} \geq 0$ | $C_{DC1} \rightarrow$ maximum value |
| Case 2.1 | $(V_{SR} - V_{SS})V_{SR} < 0$ | $C_{DC1} \rightarrow$ minimum value |
| Case 1.2 | $(V_{SI} - V_{SS})V_{SI} \geq 0$ | $C_{DC2} \rightarrow$ maximum value |
| Case 2.2 | $(V_{SI} - V_{SS})V_{SI} < 0$ | $C_{DC2} \rightarrow$ minimum value |

Again, scheme B, similarly to scheme A, has the three effects produced on the suspension by the combined adjustment of the dissipaters DC1 and DC2, even if in a different manner. In fact, for example, as regards the static condition, the following possible limit adjustments reported in Table 6 apply when the damping is ideal and it can pass from a null value to an infinite value:

TABLE 6

Limit adjustment under a static condition related to scheme B

| | DC1 | |
| | Null damping of DC1 ($C_{DC1} = 0$) | Infinite damping of DC1 ($C_{DC1} = \infty$) |
|---|---|---|
| DC2 | | |
| Null damping of DC2 ($C_{DC2} = 0$) | Static stiffness $\dfrac{k_{EL1} * k_{EL2}}{(k_{EL1} + k_{EL2})}$ | Static stiffness $k_{EL2}$ |
| Infinite damping of DC2 ($C_{DC2} = \infty$) | Infinite static stiffness | Infinite static stiffness |

Scheme C, as schemes A and B, also has the above-mentioned three effects produced on the suspension by the combined adjustment of the dissipaters DC1 and DC2. In particular, analyzing the first effect reported in Table 7, it should be noted that the stiffness of the system can be changed by combining the different damping values of DC1 and DC2:

TABLE 7

Limit adjustment under a static condition related to scheme C

| | DC1 | |
| | Null damping of DC1 ($C_{DC1} = 0$) | Infinite damping of DC1 ($C_{DC1} = \infty$) |
|---|---|---|
| DC2 | | |
| Null damping of DC2 ($C_{DC2} = 0$) | Static stiffness $k_{EL2}$ | Static stiffness $k_{EL2}$ |
| Infinite damping of DC2 ($C_{DC2} = \infty$) | Static stiffness $k_{EL1} + k_{EL2}$ | Infinite static stiffness |

Scheme D has an intermediate body SI capable of tilting by virtue of the presence of hinges CER; in fact, dissipaters DC1 and DC3, elastic elements El1, El3 and dissipater DC2 are connected by means of hinges. This causes the intermediate body SI to be able to both tilt and move vertically. The controlled dampers are the dissipaters DC1 and DC2, while DC3 is a passive damper, i.e. with a predetermined damping value. In Table 8, the effect on the stiffness of the suspension by combining the different damping values of dissipaters DC1 and DC2 is reported, where $coeff_1$ and $coeff_2$ are constants depending on the horizontal distance between the hinge of the elastic elements EL1, EL3 and the hinge of dissipater DC2:

TABLE 8

Limit adjustment under a static condition related to scheme D

| | DC1 | |
| | Null damping of DC1 ($C_{DC1} = 0$) | Infinite damping of DC1 ($C_{DC1} = \infty$) |
|---|---|---|
| DC2 | | |
| Null damping of DC2 ($C_{DC2} = 0$) | Static stiffness $k_{EL2}$ | Static stiffness $k_{EL2}$ |
| Infinite damping of DC2 ($C_{DC2} = \infty$) | Static stiffness $k_{EL1} coef_1 + k_{EL2} + k_{EL3} coeff_3$ | Static stiffness $k_{EL2} + k_{EL3} * coeff_3$ |

Scheme E, as scheme D, has an intermediate body SI capable of tilting by virtue of the presence of the hinges CER; in fact, dissipaters DC1, DC2, elastic elements EL1, EL2 and EL3 are connected by hinges. This causes the intermediate body SI to be able to both rotate and translate vertically. In Table 9, the effect on the stiffness of the suspension by combining the different damping values of dissipaters DC1 and DC2 is reported, where $coeff_1$ and $coeff_2$ are constants depending on the horizontal distance between the hinge of the elastic elements EL1 and EL2 and the hinge of the elastic element EL3:

TABLE 9

Limit adjustment under a static condition related to scheme E

| | DC | |
| | Null damping of DC1 ($C_{DC1} = 0$) | Infinite damping of DC1 ($C_{DC1} = \infty$) |
|---|---|---|
| DC2 | | |
| Null damping of DC2 ($C_{DC2} = 0$) | Static stiffness $\dfrac{(k_{EL1}coeff_1 + k_{EL2}coeff_2) * k_{EL3}}{((k_{EL1}coeff_1 + k_{EL2}coeff_2) + k_{EL3})}$ | Static stiffness $\dfrac{k_{EL2}coeff_2 * k_{EL3}}{(k_{EL2}coeff_2 + k_{EL3})}$ |
| Infinite damping of DC2 ($C_{DC2} = \infty$) | Static stiffness $\dfrac{k_{EL1}coeff_1 * k_{EL3}}{(k_{EL1}coeff_1 + k_{EL3})}$ | Static stiffness $k_{EL3}$ |

Figure 17:
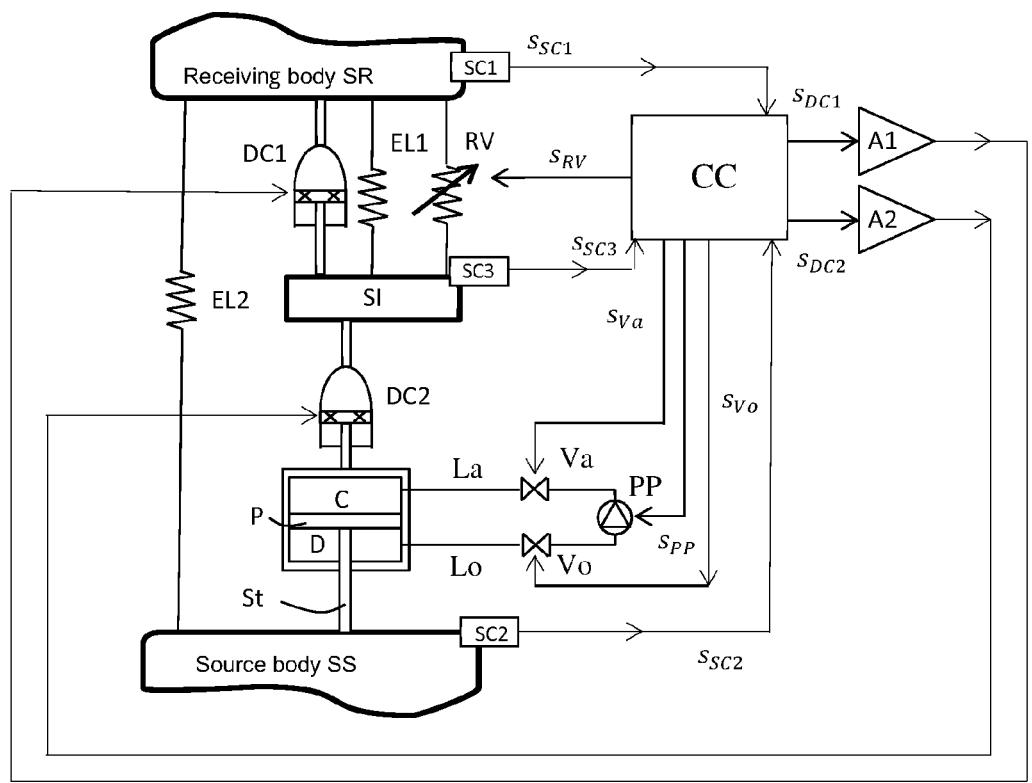
FIG. 17 depicts a scheme of a sixth embodiment of the suspension of the invention with control system (scheme F)

The basic architecture of scheme F, depicted in FIG. 17, is compliant to that of scheme C, differing only in the addition of two devices which can help to obtain an increasingly performing suspension by virtue of a variable stiffness device RV, for example, a system with a suitably adjusted air spring arranged between the source body SR and the intermediate body SI, and a device C, D, St, P with valves Va and Vo for the almost static adjustment of the suspension level. The valves Va and Vo are connected to the chambers C and D, respectively, by means of the circuits La and Lo, and they manage the fluid level between the two chambers, so as to allow piston P to take various positions, hence adjusting the suspension height. The valves and pump of circuit PP are adjusted by the control unit CC. Piston P is rigidly connected to the source body SS by means of stem St, while the chambers C and D are rigidly connected to dissipater DC2. System RV is also adjusted by unit CC. Therefore, such devices can be inserted in all the embodiments of the suspension of the invention so as to obtain a suspension as much performing as possible in terms of refinement and possibility of fine adjustment.

Figure 19:
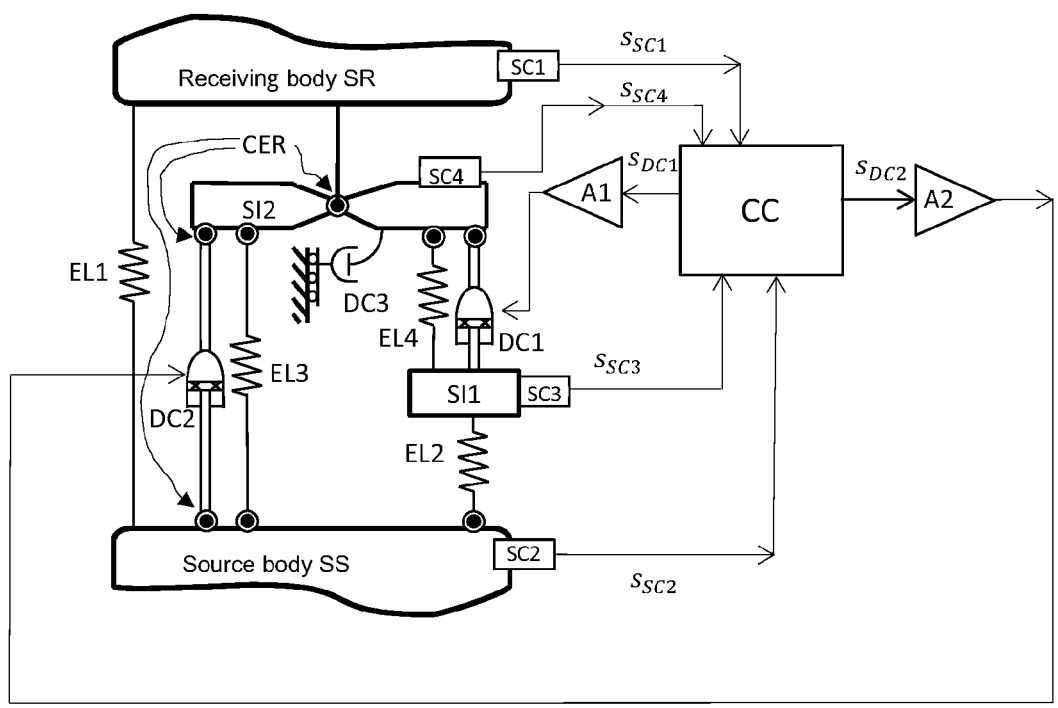
FIG. 19 depicts a scheme of a seventh embodiment of the suspension of the invention with control system (scheme G)
Figure 24:
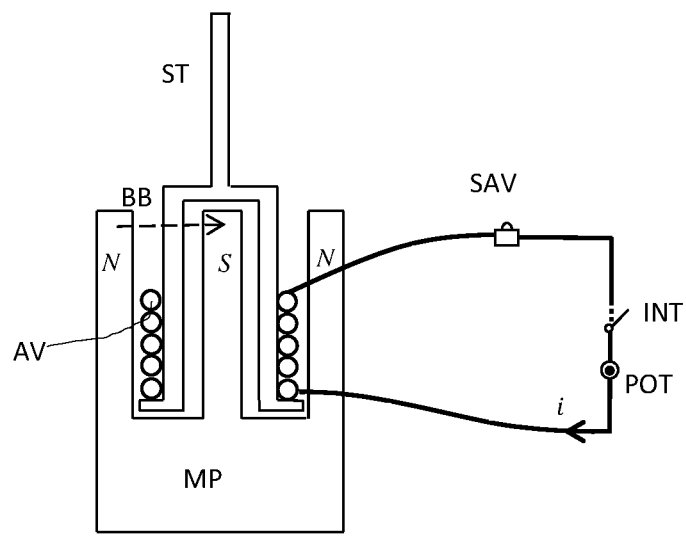
FIG. 24 depicts a diagrammatic axial section of a first embodiment of an element of the suspension in FIG. 23.

Scheme G has two intermediate bodies SI1 and SI2. In particular, the intermediate body SI2, in addition to move vertically since it is constrained to the receiving body SR, can also tilt by virtue of the presence of hinge CER. The tilting of the intermediate body SI2 can be combined to a passive circular dissipater DC3 as shown in FIG. 19. The dissipaters DC1 and DC2 are controlled by the control unit CC. An additional sensor is present in this scheme, in order to monitor and process the physical parameters of the bodies SS, SR, SI1 and SI2. Dissipater DC2 and elastic element EL3 are connected to intermediate body SI2 and source body SS by means of hinges CER, the elastic element EL4 and the dissipater DC1 are connected to intermediate body SI2 by means of hinges, and the elastic element EL2 is connected to source body SS by means of a hinge. The ideal adjustment under static conditions is reported in Table 10 (where $coeff_1$ and $coeff_2$ are constants depending on the horzontal distance between the hinge of the elastic elements EL3 and EL4 and the central hinge of the intermediate body SI2:

and closes the electric connection, and a potentiometer POT, i.e. an electric resistance regulator (see FIG. 24). Both INT and POT are managed by an electric control unit CE which, in turn, is managed by the control unit CC. In addition to control the electric unit CE, the control unit CC analyzes the data from the sensors SC1, SC2 in terms of absolute- and/or relative-type speed and/or position and/or acceleration of the source SS and receiving SR bodies, and the data from sensor SAV in terms of measurements of voltage and/or current circulating in the external circuit. Once the control unit CC has analyzed the data from the sensors by means of a suitably developed algorithm, it controls electric unit CE and dissipater DC.

The control algorithms which can be used are, for example, those referred to as the above-described DERC and DAC, with a minor change. In fact, if we consider a simpler configuration of the external circuit connected to the winding AV, i.e. consisting only of switch INT, a resistor, a fixed inductance and sensor SAV acting as an amperemeter, a real damper can be created, which dissipates the minimum energy when switch INT is open, and which dissipates the maximum energy when the switch is closed. In this case, DAC follows the following law, i.e. finding the best combination reported in Table 11 which minimizes, for each time instant, the following absolute-value expression:

$$[c_{DC}*(V_{SR}-V_{SS})+k_{EL}*(spo_{SR}-spo_{SS})+F(i)]$$

where $V_{SR}$ is the absolute speed of receiving body SR, $V_{SS}$ is the absolute speed of source, $spo_{SR}$ is the absolute displacement of receiving body SR, $spo_{SS}$ is the absolute displacement of source, whereas $F(i)$ is the force which would be exerted between the receiving SR and source SS bodies and which varies from a maximum value when the switch is closed, hence a current i circulates in the circuit, to a minimum value when the switch INT is open instead (no current circulates).

TABLE 11

| Combination 1: | $C_{DC}$ → minimum value<br>INT → open |
| --- | --- |
| Combination 2: | $C_{DC}$ → minimum value<br>INT → closed |

TABLE 10

Limit adjustment under a static condition related to scheme G

| | DC1 | |
| --- | --- | --- |
| DC2 | Null damping of DC1<br>($C_{DC1} = 0$) | Infinite damping of DC1<br>($C_{DC1} = \infty$) |
| Null damping of DC2<br>($C_{DC2} = 0$) | Static stiffness<br>$k_{EL1} + \left(k_{EL3}coeff_1 + \dfrac{k_{EL2}*k_{EL4}}{(k_{EL2}+k_{EL4})}coeff_2\right)$ | Static stiffness<br>$k_{EL1} + k_{EL3}coeff_1 + k_{EL2}coeff_2$ |
| Infinite damping of DC2<br>($C_{DC2} = \infty$) | Static stiffness<br>$k_{EL1} + \left(\dfrac{k_{EL2}*k_{EL4}}{(k_{EL2}+k_{EL4})}2\right)$ | Static stiffness<br>$k_{EL1} + k_{EL2}2$ |

Figure 23:
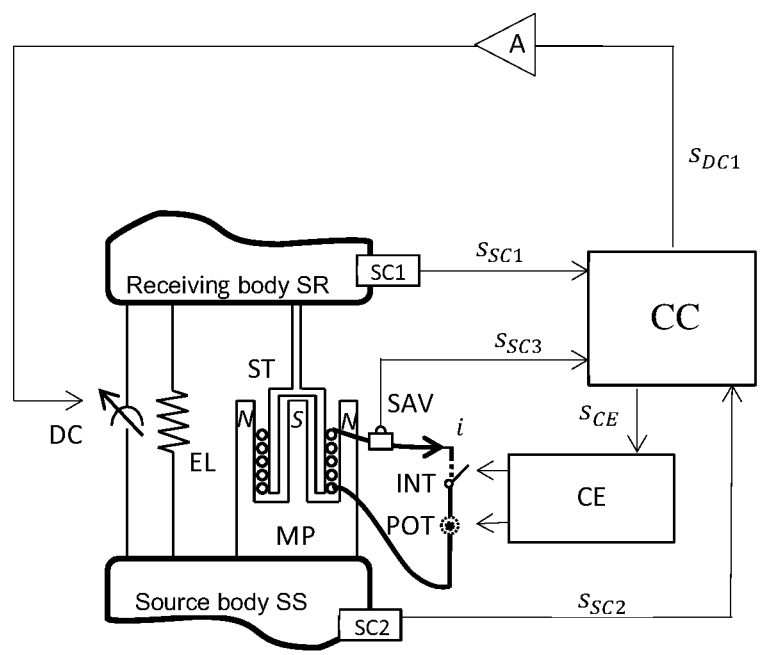
FIG. 23 depicts a scheme of an eighth embodiment of the suspension of the invention with control system (scheme H)

Instead, as regards scheme H depicted in FIG. 23, the second damping device placed side by side with the first dissipater DC is a device provided with two parts which move relative to each other. The first part is connected to the source body SS and is indicated with MP, and it is a permanent magnet generating a fixed magnetic field inside a gap in which the second part referred to as the stem ST slides, on which an electric winding is wound, which is connected to an external electric circuit consisting of a current and voltage sensor SAV, a switch INT which opens TABLE 11-continued

| Combination 3: | $C_{DC}$ → maximum value<br>INT → open |
| --- | --- |
| Combination 4: | $C_{DC}$ → maximum value<br>INT → closed |

In addition, DERC has the following law:

TABLE 12

| CASES | CHECK | ACTION |
|---|---|---|
| 1 | $(V_{SR} - V_{SS})V_{SR} \geq 0$ | $\begin{cases} C_{DC1} \rightarrow \text{maximum value} \\ \text{INT} \rightarrow \text{open} \end{cases}$ |
| 2 | $(V_{SR} - V_{SS})V_{SR} < 0$ | $\begin{cases} C_{DC1} \rightarrow \text{minimum value} \\ \text{INT} \rightarrow \text{closed} \end{cases}$ |

Different control algorithms can also manage a electronic resistance regulator POT so as to have different variation stages of the dissipation force F(i) according to the amount of current circulating in the circuit.

Figure 25:
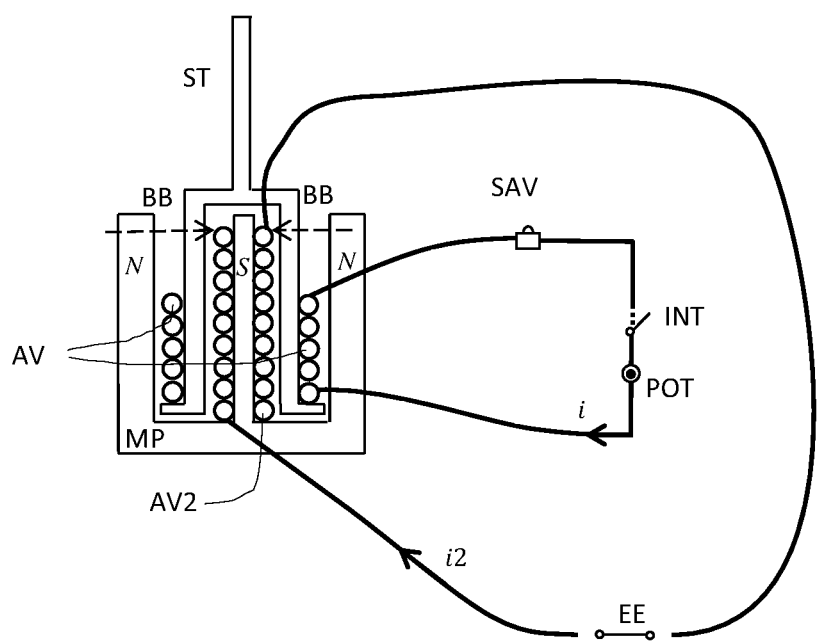
FIG. 25 depicts a diagrammatic axial section of a second embodiment of an element of the suspension in FIG. 23.

Two embodiments of different permanent magnets and with different windings are shown in FIGS. 24 and 25. In particular, FIG. 24 is a completely passive solution, as during the rectilinear and intermittent motion of stem ST with winding AV, compared to the permanent magnet MP which autonomously generates a magnetic field BB perpendicular to the motion of stem ST, a current in the external circuit AV is generated when switch INT is closed. This is due to the Lorentz force, in fact if a winding moves inside a magnetic field with an intermittent motion, it will generate a current i circulating in the winding itself.

In FIG. 25, a semiactive solution for controlling the suspension is suggested, because the magnetic field BB is generated not only by the permanent magnet, but it is also assisted by a secondary winding exactly wound on the magnet AV2 itself which, by means of a voltage EE, generates an electric current i2, hence a magnetic field which adds to the existing one BB due to the presence of MP.

Figure 38:
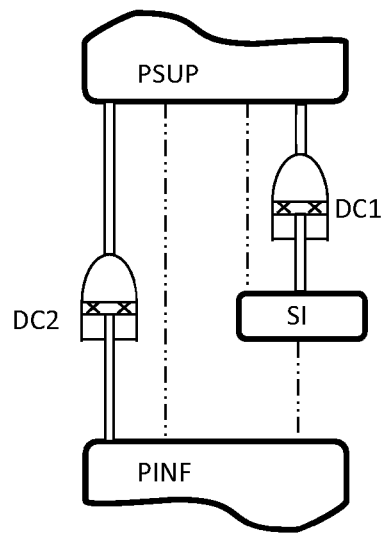
FIG. 38 depicts the parallel module of the suspension of the invention to which the suspension schemes in FIGS. 1, 6, 23 refer.
Figure 39:
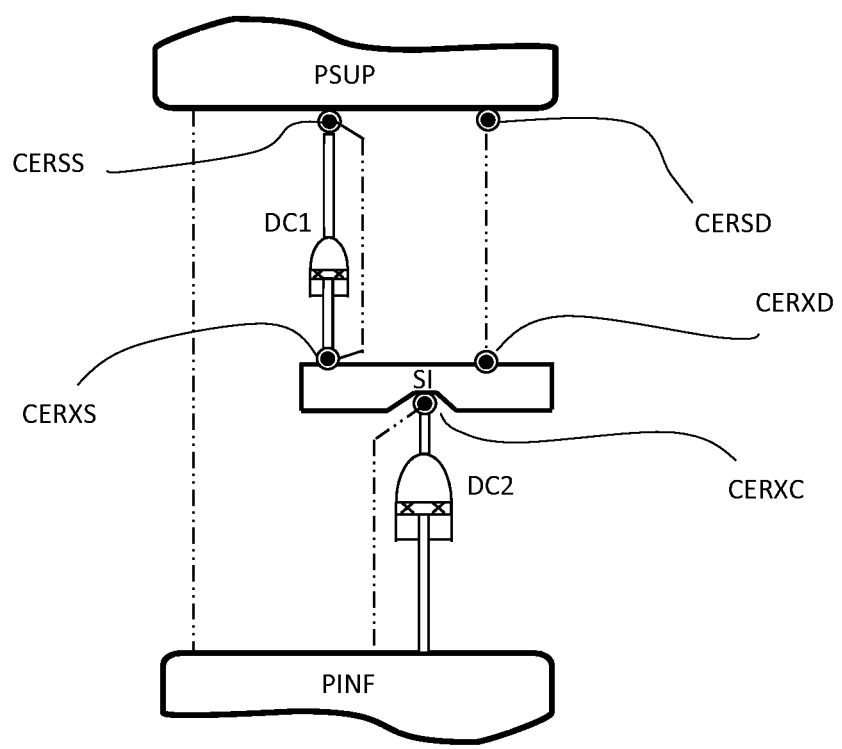
FIG. 39 depicts the tilting module of the suspension of the invention to which the suspension schemes in FIGS. 12, 15, 19 refer.
Figure 39A:
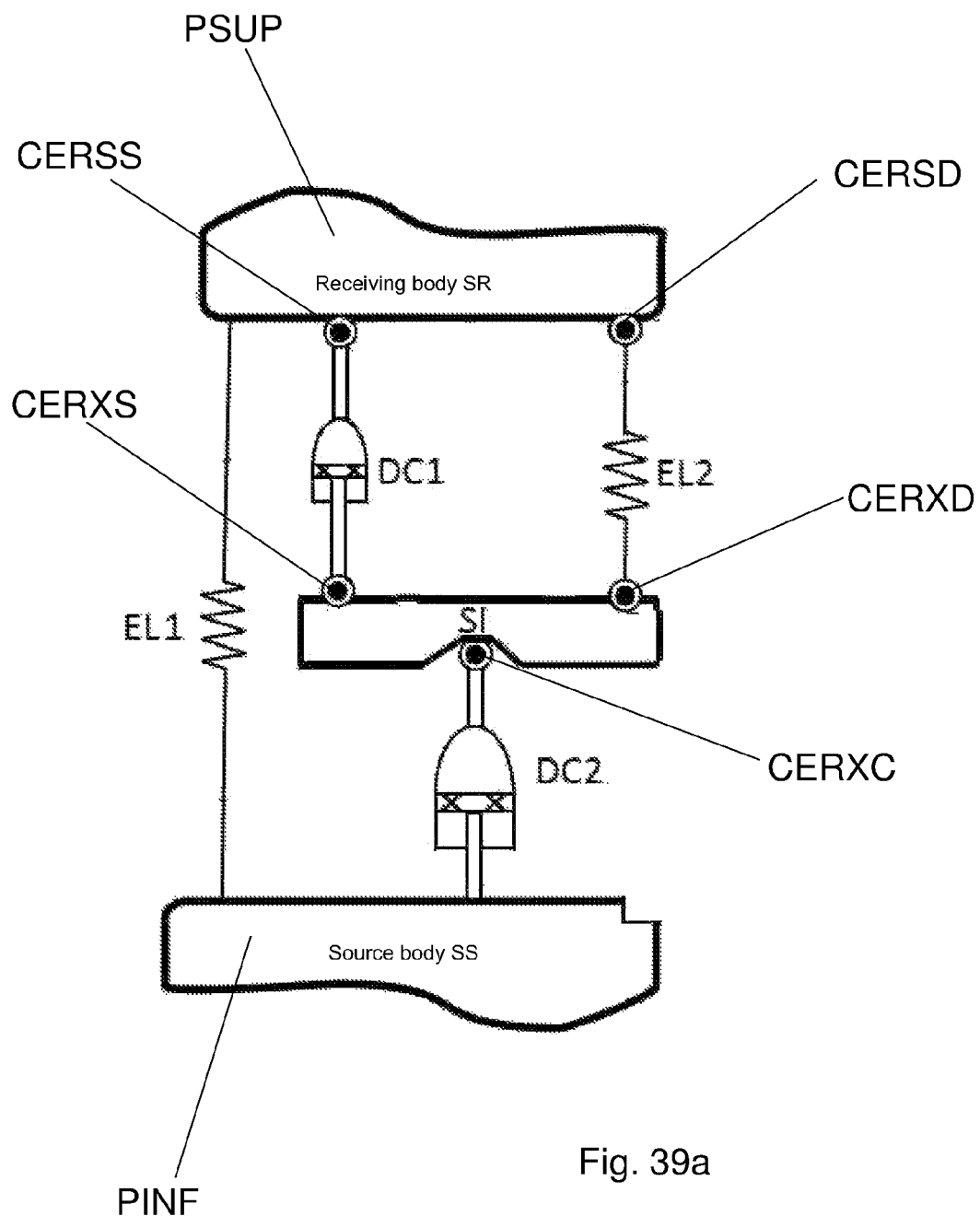
FIG. 39*a* depicts an embodiment according to FIG. 39.

In FIGS. 23, 24 and 25, the current i represents the intermediate body SI described in FIG. 38 with regard to the parallel module; the opening and closing of switch INT, the resistance variation of POT and the inductive couplings of the electric circuit represent the dissipater DC1 described in FIG. 38; the dissipator DC in FIG. 23 represents the dissipater DC2 described in FIG. 38. The second elastic element related to the scheme in FIG. 23 is represented by the current i circulating inside winding AV, within POT, hence in all the couplings of resistive type.

Figure 26:
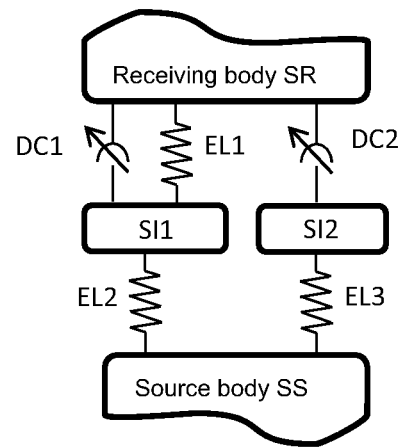
FIG. 26 depicts part of a scheme of a ninth embodiment of the suspension of the invention (scheme I)
Figure 27:
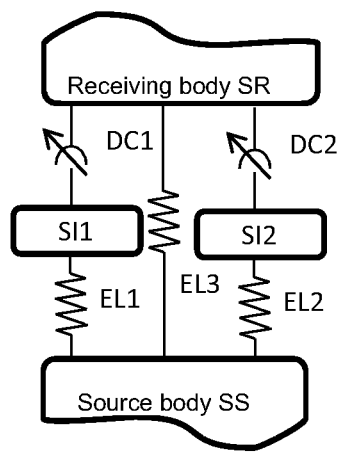
FIG. 27 depicts part of a scheme of a tenth embodiment of the suspension of the invention (scheme L)
Figure 28:
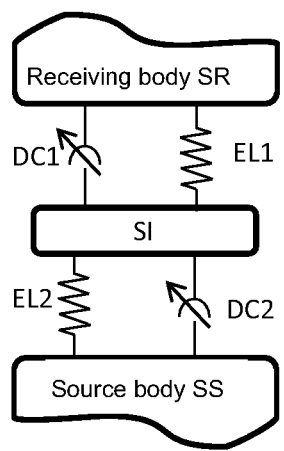
FIG. 28 depicts part of a scheme of an eleventh embodiment of the suspension of the invention (scheme M)

In FIGS. 26 to 28, other basic schemes I, L, M of the suspension are depicted, in which, again by virtue of the possibility to control two dissipaters DC1 and DC2, the suspension stiffness can be changed while maintaining the three effects of the above-described embodiments of the invention:
  ideal static control of the system stiffness,
  actual static control of the system stiffness, and
  variation of the dynamic stiffness by virtue of a control algorithm suitably used.

Figure 22:
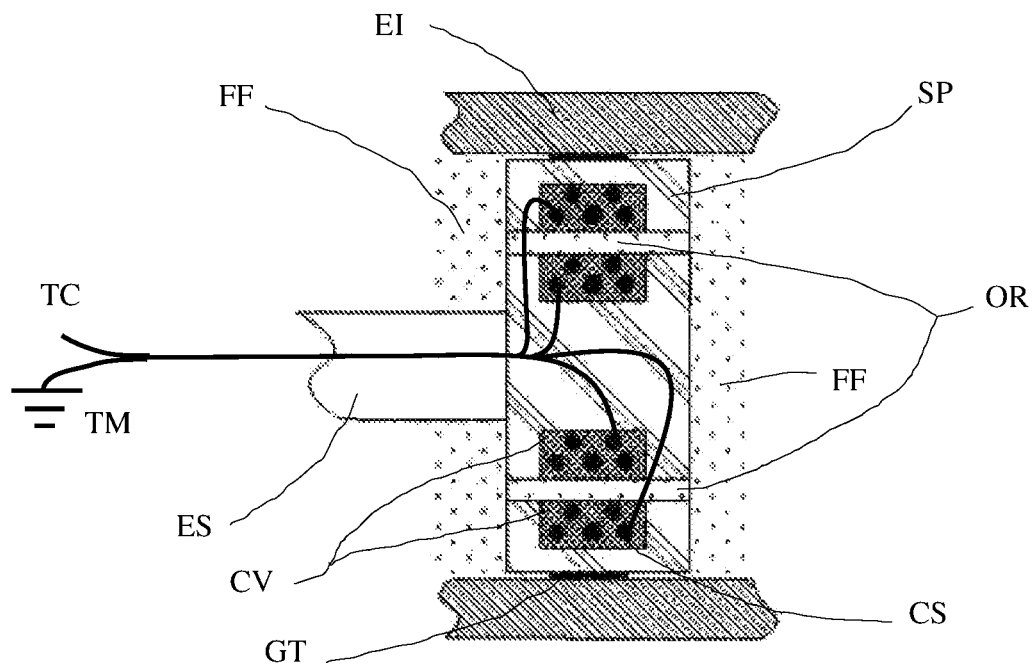
FIG. 22 depicts an enlarged detail of an element of the suspension of the invention.

In FIG. 22, a dissipater DC with magnetorheological-type controlled damping, which is used in the described embodiments of the invention where a ferrofluid is used, is depicted in detail. It consists of pistons ES and EI which move relative to each other. Piston ES moves inside a chamber filled with ferrofluid FF and comprises seals GT. Piston ES, by sliding in chamber FF, forces the ferrofluid FF to pass through the orifices OR. Piston ES has grooves CV in which one or more windings CS are wound. The ends of winding CS are connected to two electric wires, the positive wire TM and the ground wire TC, exiting the stem of piston ES. Therefore, dissipater DC consists of piston ES, which slides with alternate motion inside the ferrofluid-containing chamber FF and can vary the dissipation force by controlling the internal winding CS by means of the control unit CC, and hence by controlling the amount of current which has to pass therethough by means of the electrical terminals TM and TC. In fact, the ferrofluid is forced to pass into the orifices OR which are immersed in a magnetic field generated by the winding CS itself. When the ferrofluid FF is located inside the orifices OR, it changes its viscosity according to the intensity of the magnetic field present therein, therefore the damping force can be changed by the operation of the control unit CC.

Figure 4:
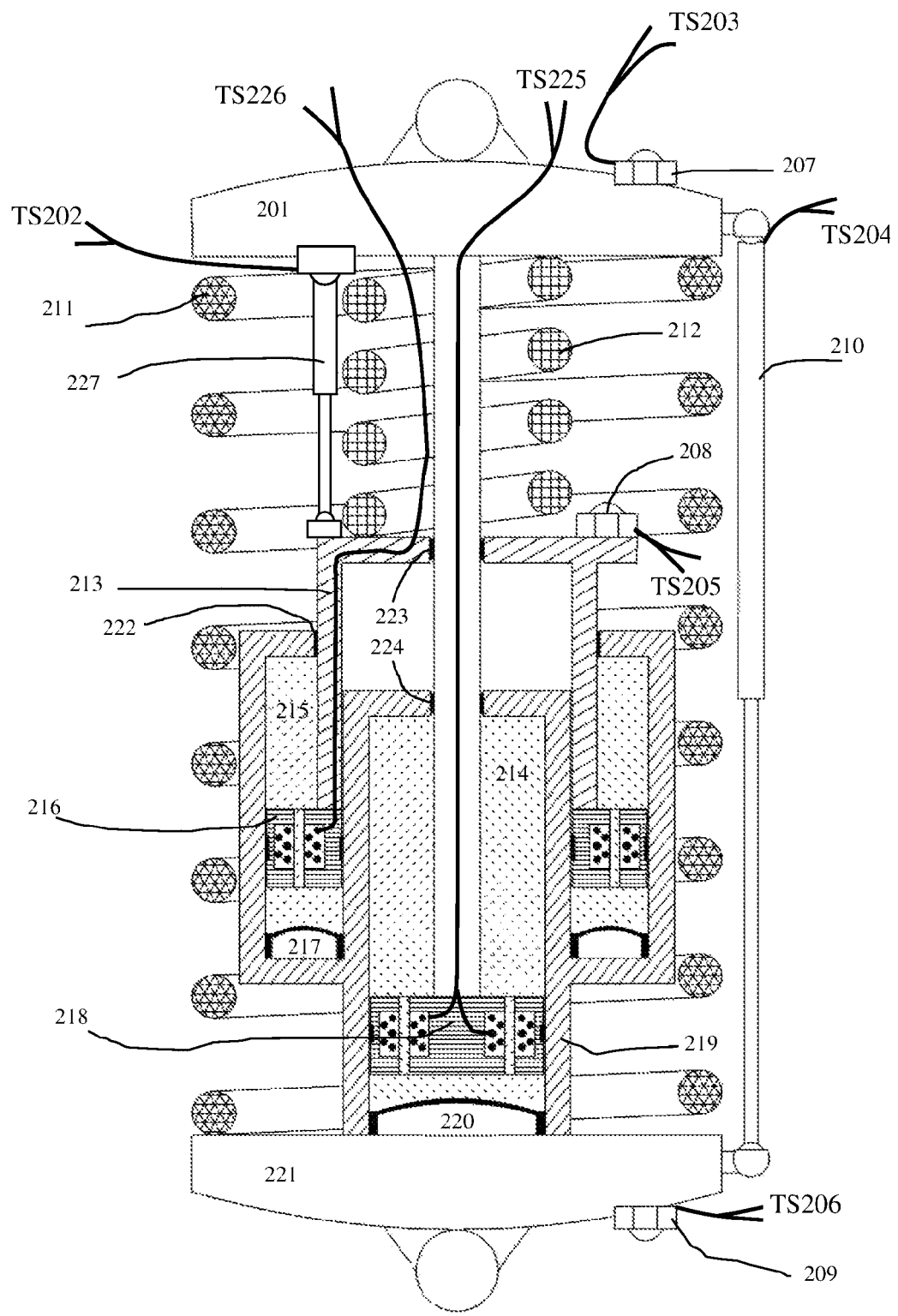
FIG. 4 depicts an axial section of a first embodiment of an element of the suspension in FIG. 1.

With particular reference to FIG. 4, there is shown the load-bearing element, also simply referred to as strut, of an embodiment of the suspension related to the scheme A in FIG. 1, in which the electronic control system is not shown. In this strut, the piston shown in FIG. 22 is used. This is the strut between the receiving body SR and the source body SS. Reference numeral 201 indicates the receiving body SR, but alternatively it could be the source body SS. Body 201 is connected to the elastic element 211, to the second elastic element 212, and to the stem connected to piston 218. Piston 218 corresponds to the first dissipater DC2 with controlled damping. Piston 218 slides in chamber 214, which is filled with ferrofluid. Piston 218, by sliding in chamber 214, forces the fluid to pass into the orifices OR. Piston 218 has the electrical terminals TS225 connected to winding CS and exiting the body 201. In this preferred solution, the hollow stem 213 represents the intermediate body SI which is connected to the external piston 216 representing DC1 which slides in the chamber 215 filled with ferrofluid. Both chamber 214 and chamber 215 are formed by the walls 219 connected to the lower support system 221. The electrical terminals of piston 216 are TS226. Both electrical terminals TS225 and TS226 are controlled by the control unit CC, which modulates the current circulating in the windings CS by means of a current amplifier. The piston 216 connected to the hollow stem 213 is connected to the coil spring 212. The coil spring 211 is directly connected between the two end suspension supports 201 and 221. The elastic membranes 217 and 220 contain a pressurized gas therein. The sealing elements 222, 223 and 224 prevent the ferrofluid from leaking outside the chambers. The sensors can be of various types according to the desired control law, for example, accelerometers 207, 209 and 208, and linear potentiometers 210 and 227 connected to the unit CC by means of the electric connections TS202, TS203, TS204, TS205 and TS206. In this variant of the suspension strut, the two chambers 214 and 215 are concentrically arranged in order to optimize the axial size.

Figure 5:
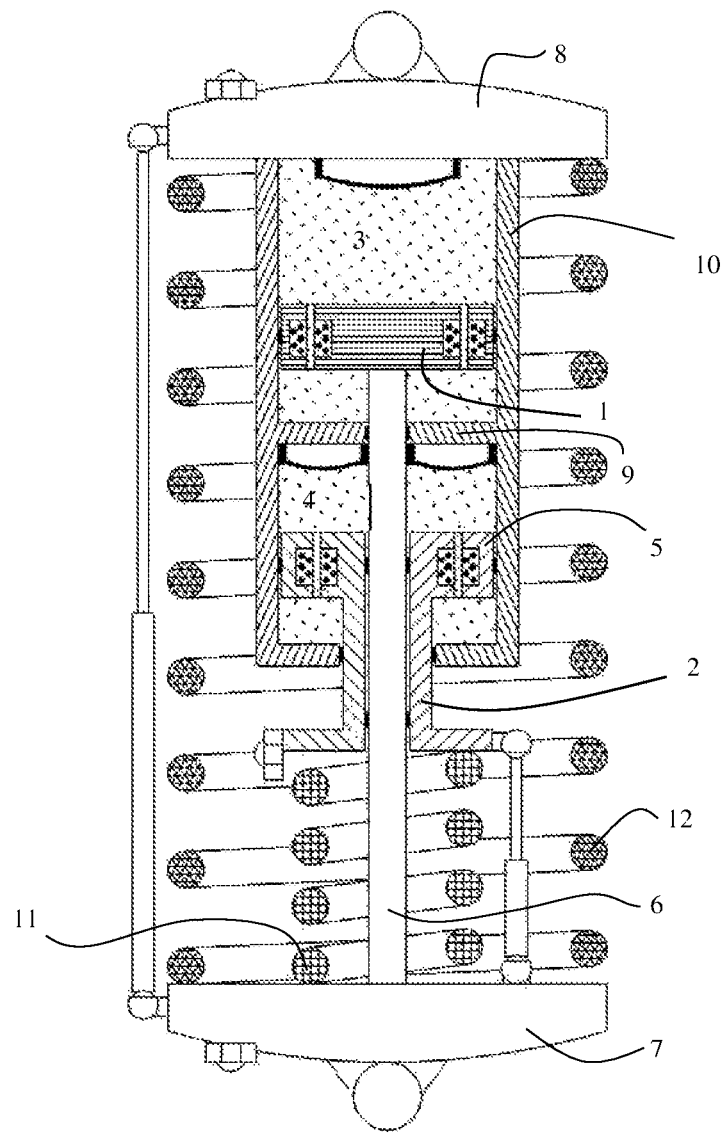
FIG. 5 depicts an axial section of a second embodiment of an element of the suspension in FIG. 1.

The embodiment of the suspension strut depicted in FIG. 5 is similar to the strut variant in FIG. 4 and it relates to the suspension scheme in FIG. 1, in which the control system is not shown for reasons of better description clarity. This strut differs in that the pistons 1 and 5 operate in line, in that the two reciprocal ferrofluid-containing chambers 3 and 4 are axially arranged in sequence so as to have a smaller radial size of the suspension. Piston 1 represents dissipater DC2 and is connected to stem 6, connected in turn to the lower support 7. The hollow stem 2 represents the intermediate body SI, connected at the bottom to the elastic element 11 and at the top to the piston 5 which represents DC1. The two ferrofluid-containing chambers are contained in 10 and are partitioned by the wall 9. The second elastic element is represented by the coil spring 12 interposed between 8, which can represent the source SS or receiving SR body, and the lower support 7, which can be the source SS or receiving SR body. The elastic element 11 is connected at the bottom to the lower support 7.

Figure 29:
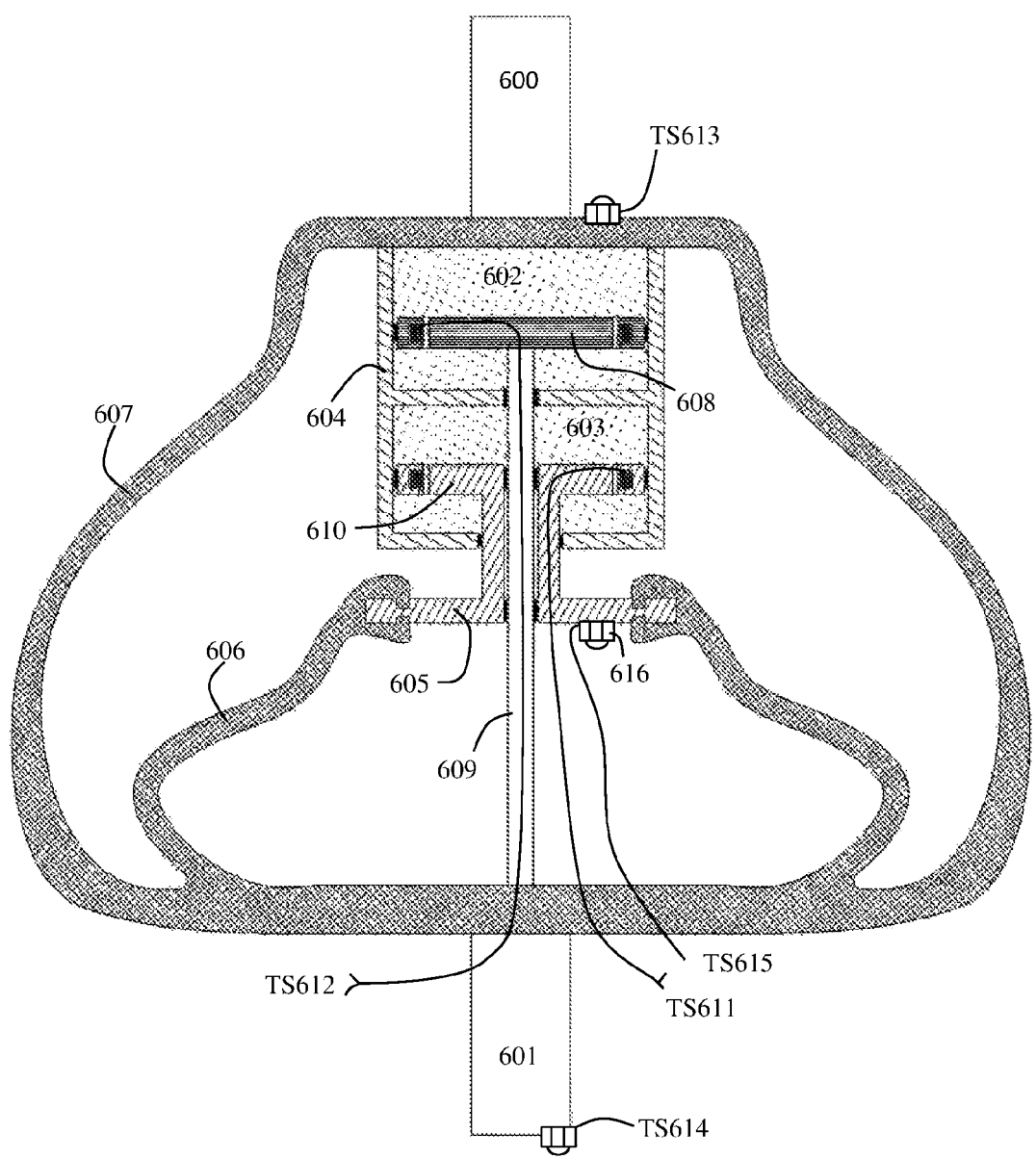
FIG. 29 depicts an axial section of a third embodiment of an element of the suspension in FIG. 1.
Figure 30:
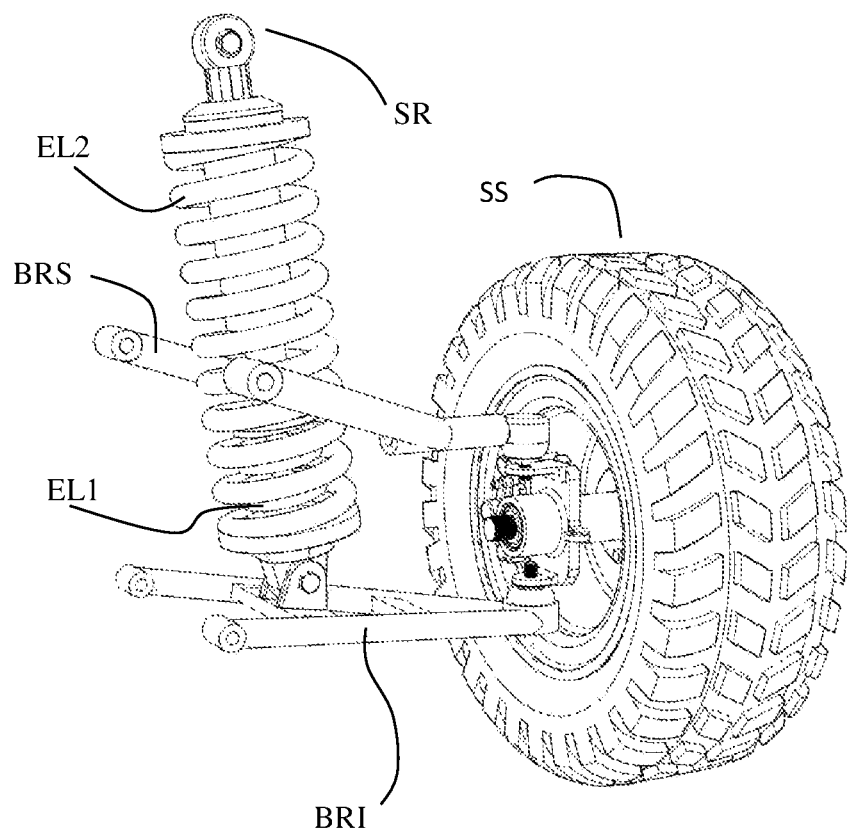
FIG. 30 depicts a particular application of the embodiment of the suspension in FIG. 1 on a road vehicle wheel.
Figure 31:
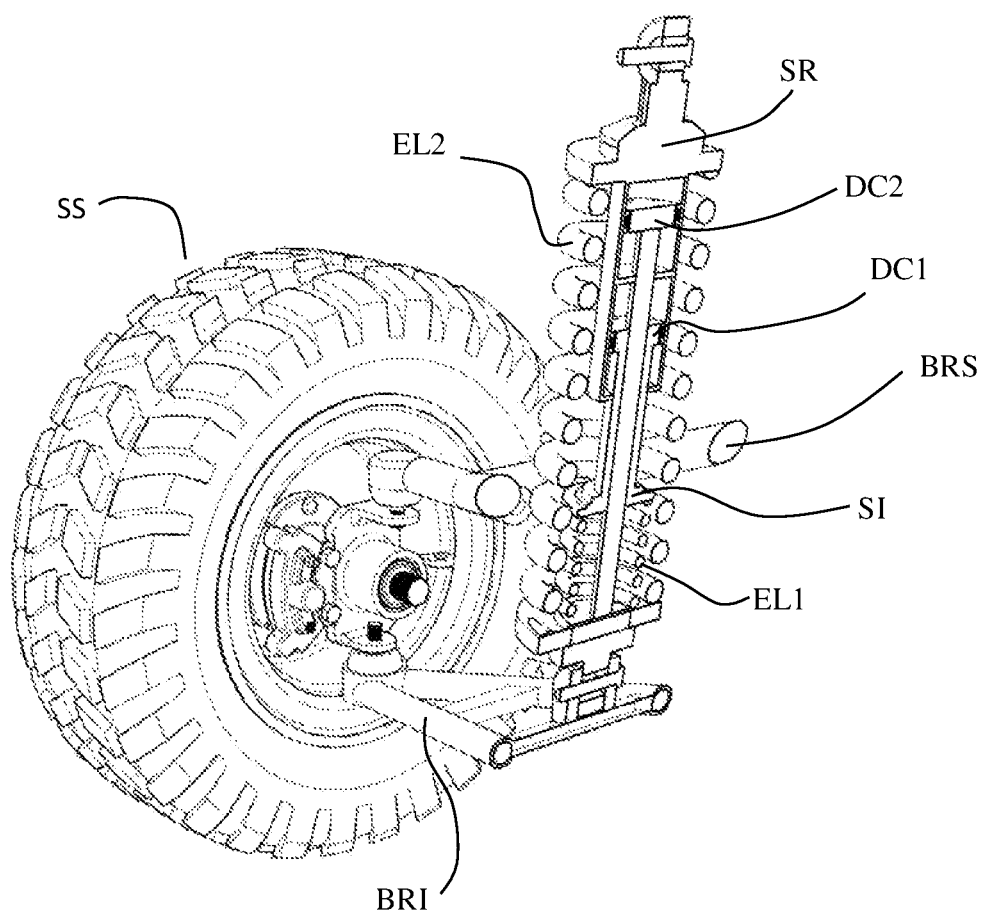
FIG. 31 depicts a sectional view of the suspension in FIG. 30.

The embodiment of the suspension strut depicted in FIG. 29 relates again to the scheme A in FIG. 1. Again in this strut variant, pistons 608 and 610 are similar to the piston in FIG. 22. This application of the suspension is an isolating anchor with double damper. The elastic elements EL1 and EL2 correspond to the chambers 606 and 607, respectively. Chamber 607 is connected to the source body 600 and to the receiving body 601, and it is defined by a polymeric wall which can be elastically deformed. Chamber 606 is connected to the intermediate body 605, corresponding to intermediate system SI, and to the receiving body 601. Piston 610 comprises an internal part sliding inside the ferrofluid-containing chamber 603 and an external part 605 connected to chamber 606. The detail of the internal part 610 is shown in FIG. 22 and represents damper DC1. The electrical terminals TS611 for the windings of piston 610 exit the anchor to be connected to the control unit CC. The piston has a sensor 616 connected to its external part 605, which measures the physical parameters of body SI and is connected to the control unit by cables TS615. Wall 604 separately contains the two ferrofluid-containing chambers 603 and 602. Piston 608, shown in detail in FIG. 22, slides inside chamber 602. Piston 608, by sliding inside chamber 602, is the implementation of dissipater DC2. Piston 608 is connected to the receiving body SR 601 by means of the stem 609. Again, piston 608 has the windings CS connected to the electric cables indicated by TS612, which exit the system and are connected to the control unit CC. TS614 is the sensor of body SR 601 connected to the control unit CC. TS613 is the sensor of system 600 connected to the control unit CC.

The embodiment of the suspension strut depicted in FIG. 35 refers again to the scheme A in FIG. 1. Also in this variant of the suspension strut, the pistons 721 and 708 are similar to the piston in FIG. 22. The receiving body SR, or alternatively the source body SS according to how the suspension is arranged, is indicated by 700. Body 700 is connected to both the elastic element 707, and the second elastic element EL2 represented by a pressurized gas chamber 702. Chamber 702 can change its volume by virtue of the floating plunger 703, which represents the intermediate system SI and which slides inside cylinder 724. By virtue of the seals 704, the floating plunger 703 keeps the pressurized gas chamber 702 and the ferrofluid-containing chamber 705 separated. Piston 721, related to the dissipater DC1 depicted in FIG. 22, slides inside chamber 705. Piston 721 pushes the floating piston 703 during its motion, thus changing the volume of the gas-containing chamber 702. Piston 721 is rigidly connected to stem 722 which, in turn, is rigidly connected to piston 708, which represents the controlled damper DC2 described in FIG. 22. Piston 708 slides inside the ferrofluid contained in chamber 706. The fluid 706 is separated from the fluid 705 by virtue of the sealing elements 709 and it cannot leak outside by virtue of the sealing elements 720. Piston 708 is rigidly connected to stem 723. Stem 723 is connected to the lower support 701. The elastic element 707 is connected at the top to the receiving body 700 and at the bottom to the source body 701. The sensors can be of various type according to the desired control law, for example, they can be accelerometers 712, 711, a sensor 715 measuring the pressure in chamber 702, and a linear potentiometer 710, all connected to the unit CC by means of the electric connections TS713, TS717, TS714, TS76. The pistons 721 and 708 are controlled by the control unit CC by means of the electric connections TS718 and TS719.

Figure 35:
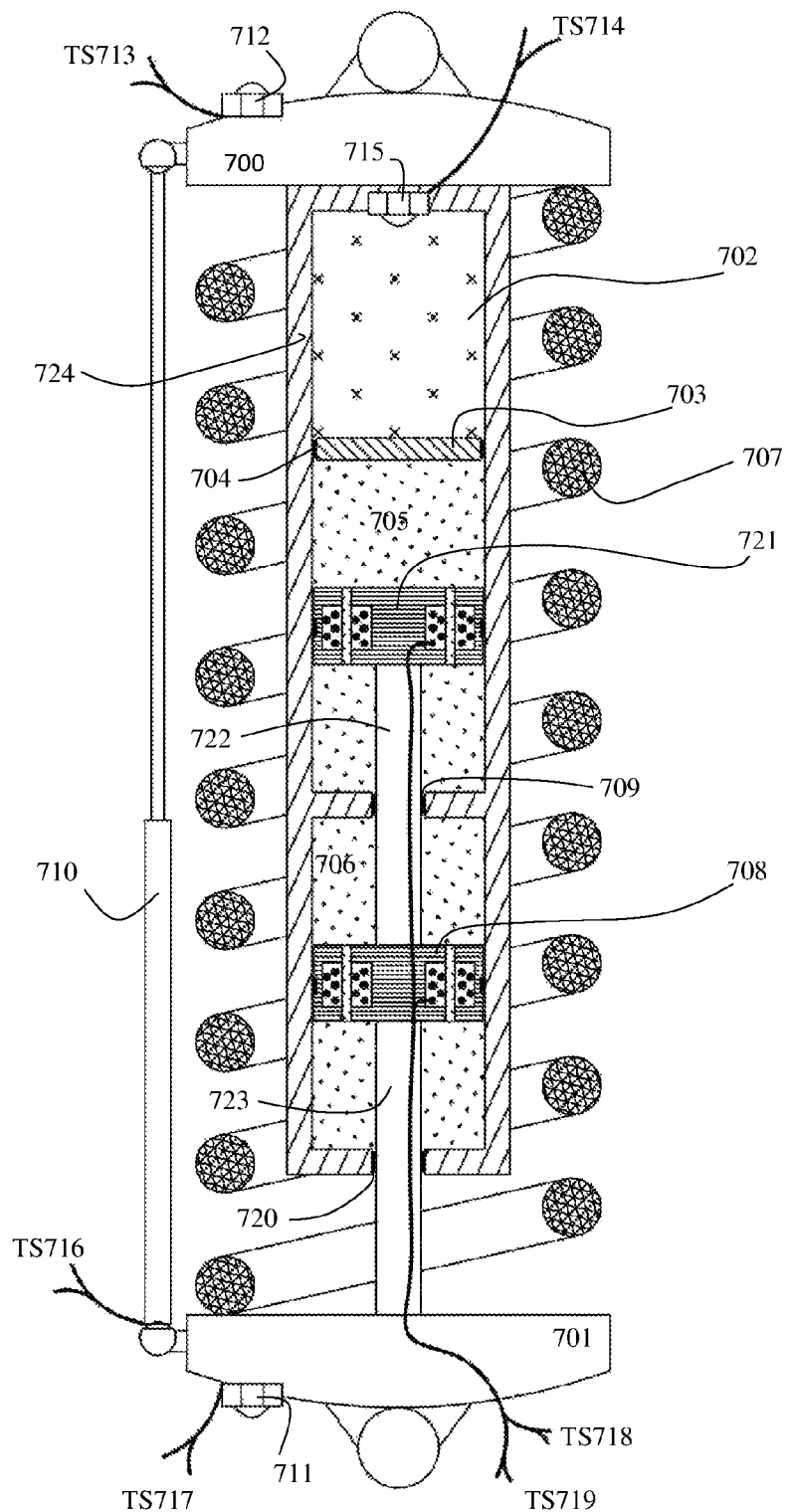
FIG. 35 depicts an axial section of a fifth embodiment of an element of the suspension in FIG. 1.
Figure 36:
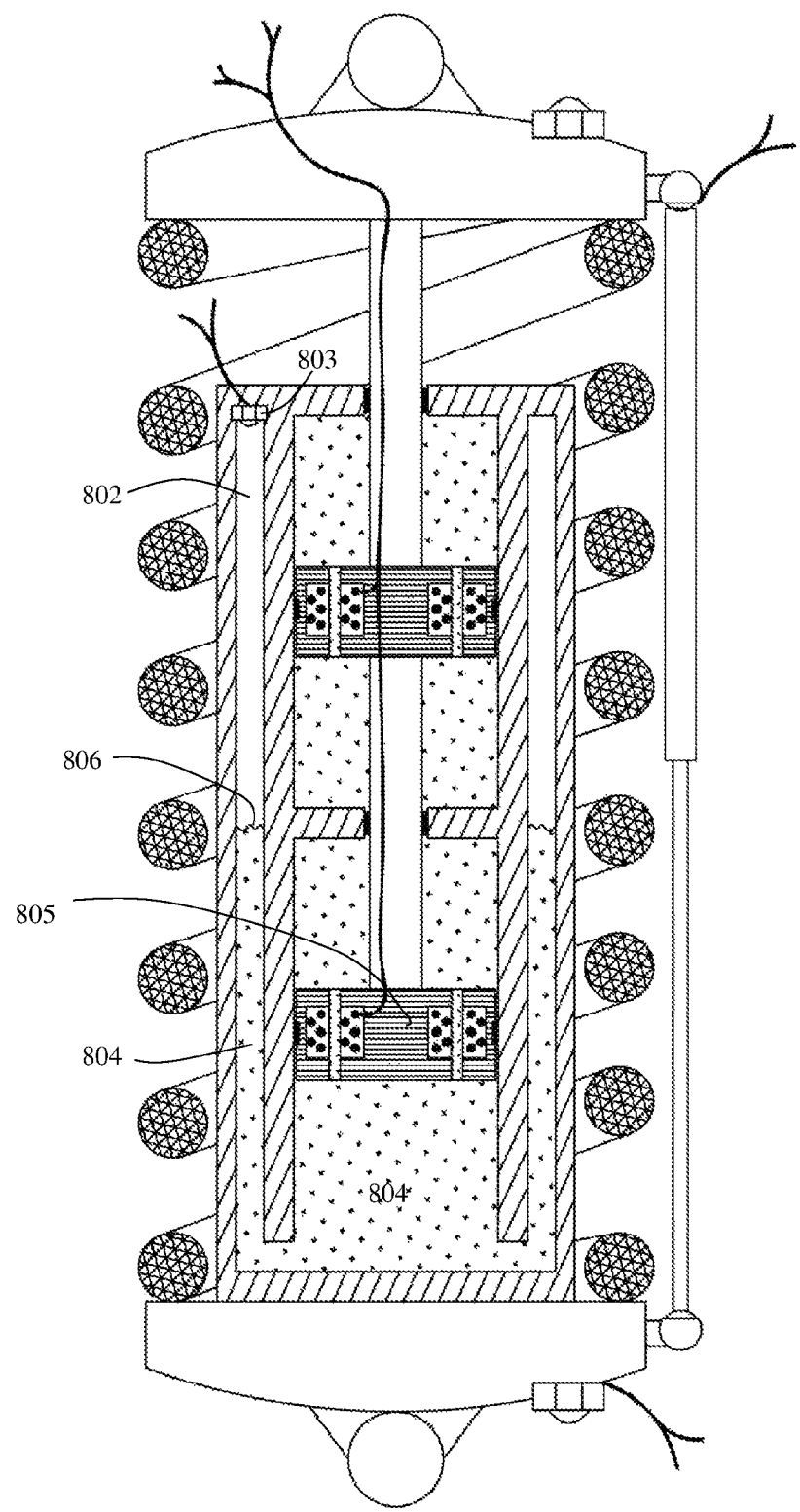
FIG. 36 depicts an axial section of a sixth embodiment of an element of the suspension in FIG. 1.
Figure 37:
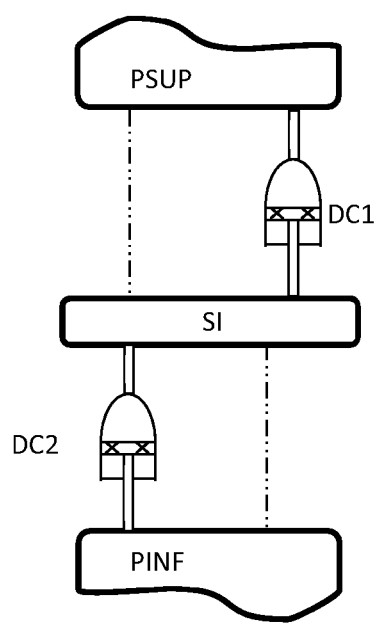
FIG. 37 depicts a series module of the suspension of the invention to which the suspension schemes in FIGS. 9, 17, 28 refer.

The embodiment of the suspension strut depicted in FIG. 36 refers again to the scheme A in FIG. 1 and it is identical to the preferred embodiment in FIG. 35, differing in that the piston associated with dissipater DC1 (805 in this figure) is immersed in a ferrofluid-containing chamber 804, also extending to an outer cylindrical chamber. In this preferred embodiment A4, the floating piston is not present, and the pressurized gas 802, which represents again the elastic element EL1, is contained in the outer cylindrical chamber and is in direct contact with the ferrofluid 804. The free surface 806 of ferrofluid 804 is in direct contact with the pressurized gas 802 and displaced by means of piston 805. The free surface 806 represents the intermediate body SI. Therefore, the alternate motion of piston 805 changes the volume of the pressurized gas 802. The pressure sensor 803 is located in the outer chamber 802.

The embodiment of the suspension strut depicted in FIG. 7 refers again to the scheme B described in FIG. 6. Also in this strut variant, the pistons 247 and 243 are similar to the piston in FIG. 22. The receiving body SR, or alternatively the source body SS, according to the arrangement of the suspension, is indicated by 250. Body 250 is connected to the elastic element 252. The elastic element 252, in turn, is connected at the bottom to the intermediate body SI represented by 254 and by chamber 256. The intermediate body SI is further connected to the second elastic element 253. The elastic element 253, in turn, is connected at the bottom to the lower support 251. Support 251 is rigidly connected to the two pistons 243 and 247 forming the implementation of the dissipaters DC2 and DC1, respectively, described in detail in FIG. 22. The two dissipaters are controlled by means of electric connections TC and TM, TS264 and TS265 respectively, and connected to the control unit CC. The pistons 243 and 247 are rigidly connected to 251 by means of stems 257 and 258. Piston 247 slides inside the chamber 248 filled with ferrofluid. Such a fluid is enclosed by the wall 239 rigidly connected to the upper support 250. Chamber 256 holds the ferrofluid 235. Piston 243, described in detail in FIG. 22, slides inside the chamber containing the ferrofluid and forms the analogue of the controlled dissipater DC2. Piston 243 is connected to winding CS by means of the electric terminal TS264. The outer chamber 256 is rigidly connected to the element 254 which allows the connections between intermediate body SI, elastic element 252 and elastic element 253. The elements 249 and 244 represent elastic membranes with a pressurized gas therein. The elements 242, 246 and 245 are sealing elements which prevent the ferrofluid from leaking outside the chamber. The sensors can be of various types according to the desired control law. SC1 is associated with 240 connected to 250, SC2 is associated with 238 connected to 251, and SC3 is associated with 241 connected to the intermediate body 254, the linear potentiometer 237 connected between 250 and 251, and the potentiometer 236 connected between 254 and 251. Such sensors are connected to the control unit CC by means of electrical terminals TS259, TS261, TS262, TS260 and TS263. The sensors SC1, SC2 and SC3 can be accelerometers, for example.

Figure 7:
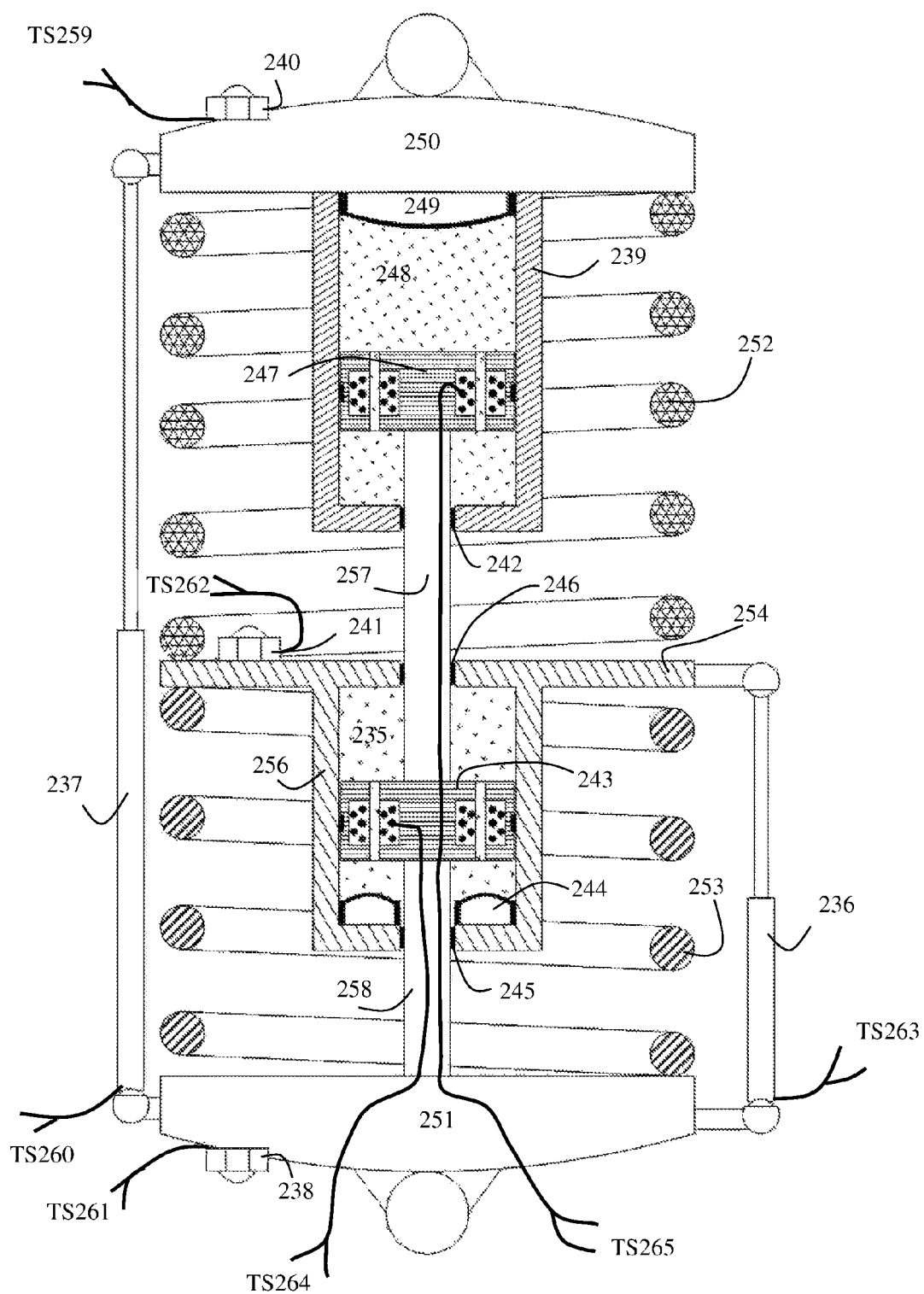
FIG. 7 depicts an axial section of a first embodiment of an element of the suspension in FIG. 6.
Figure 8:
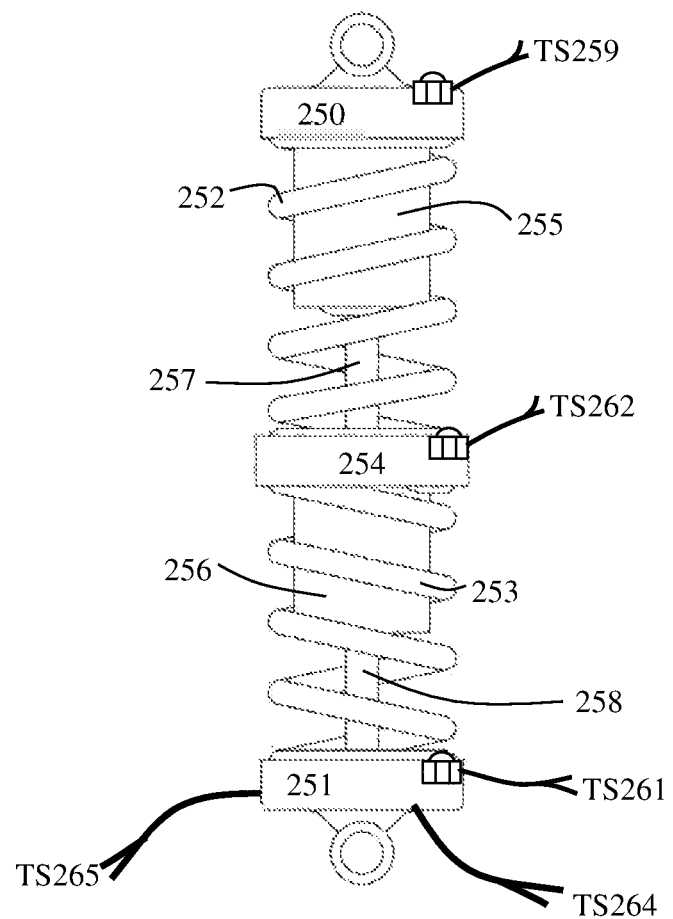
FIG. 8 depicts an axial section of a second embodiment of an element of the suspension in FIG. 6.

A possible assembly of the configuration described in detail in FIG. 7 is depicted in FIG. 8 through an external view where potentiometers are not shown.

Figure 9:
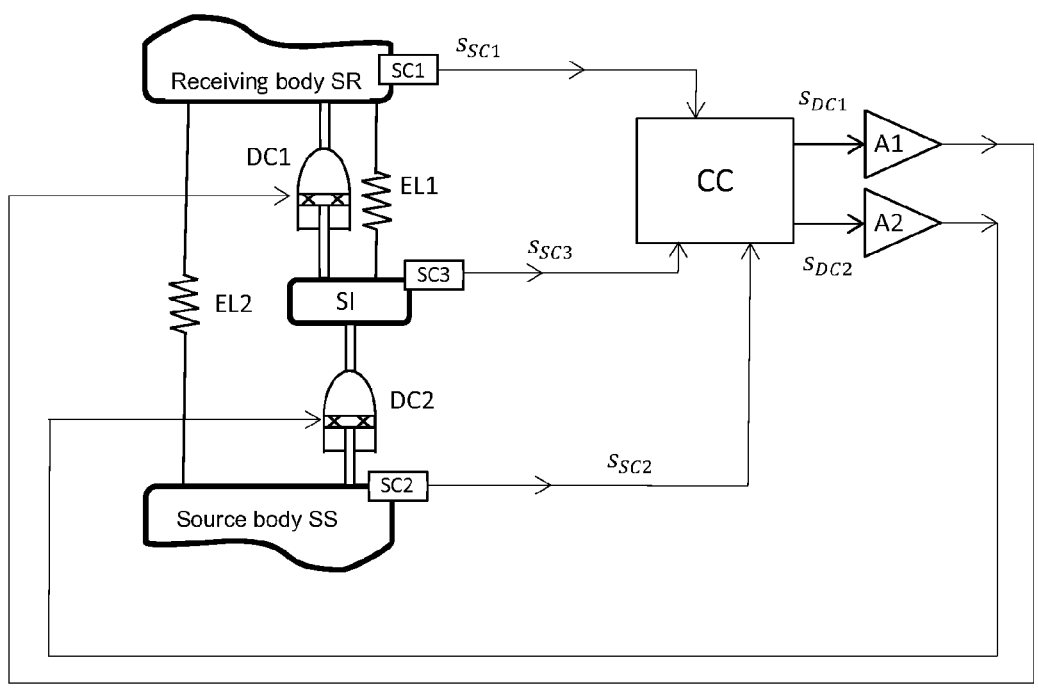
FIG. 9 depicts a scheme of a third embodiment of the suspension of the invention with control system (scheme C)

The embodiment of the suspension strut depicted in FIG. 10 refers again to the scheme C described in FIG. 9. Also in this strut variant, the piston 303 and the orifice of part 307 are similar to the piston in FIG. 22. The receiving body SR, or alternatively the source body SS, is indicated by 300. The receiving body 300 is connected to both the elastic element 305 and the elastic element 304. Both 304 and 305 represent the elastic element EL2 of the scheme in FIG. 9. Piston 303 corresponds to the controlled dissipater DC2 described in FIG. 22, and it is connected to both 305 and the stem 302. Stem 302, in turn, is connected to the system 301. Piston 303, by sliding in the ferrofluid-containing chamber 306, forces the fluid to pass into the orifices 307 having the same operational principle of the piston shown in FIG. 22, with the only difference that it is stationary, and instead it is the fluid that passes from a chamber 306 to the other 319. Therefore, the operational principle of orifice 307 is related to dissipater DC1. In such a configuration, the intermediate body SI is represented by the fluid FF contained in the chambers 306 and 319. Piston 303 has the electrical terminals TS318 connected to the winding CS and exiting the source body 301. The windings of DC1, surrounding orifice OR 307, are connected by means of the electrical terminals TS317. Both TS317 and TS318 are controlled by the control unit CC which modulates the current circulating in the windings by means of a current amplifier. The coil spring 304 is directly connected between the two end suspension supports which are integral with the receiving body 300 and the source body 301. The coil spring 305 is instead connected between the piston 303 and the upper support 300. The source body 310 is an elastic membrane with a pressurized gas therein and, in this preferred solution, represents the second elastic element EL1 of the scheme in FIG. 9. Element 319 is a sealing element which prevents the ferrofluid from leaking outside the chamber. The sensors can be of various types according to the desired control law. Sensor SC1 is associated with 311, sensor SC2 is associated with 312 and sensor SC3 is associated with 308 and with the linear potentiometer 309, all connected to the control unit CC by means of the electric connections T1315, TS316, TS313, TS314. The sensors SC1 and SC2 can be, for example, accelerometers, whereas SC3 is a pressure sensor measuring the pressure of chamber 310, so that physical magnitudes of interest related to intermediate body SI represented by the ferrofluid contained in chambers 306, 319 are measured.

Figure 10:
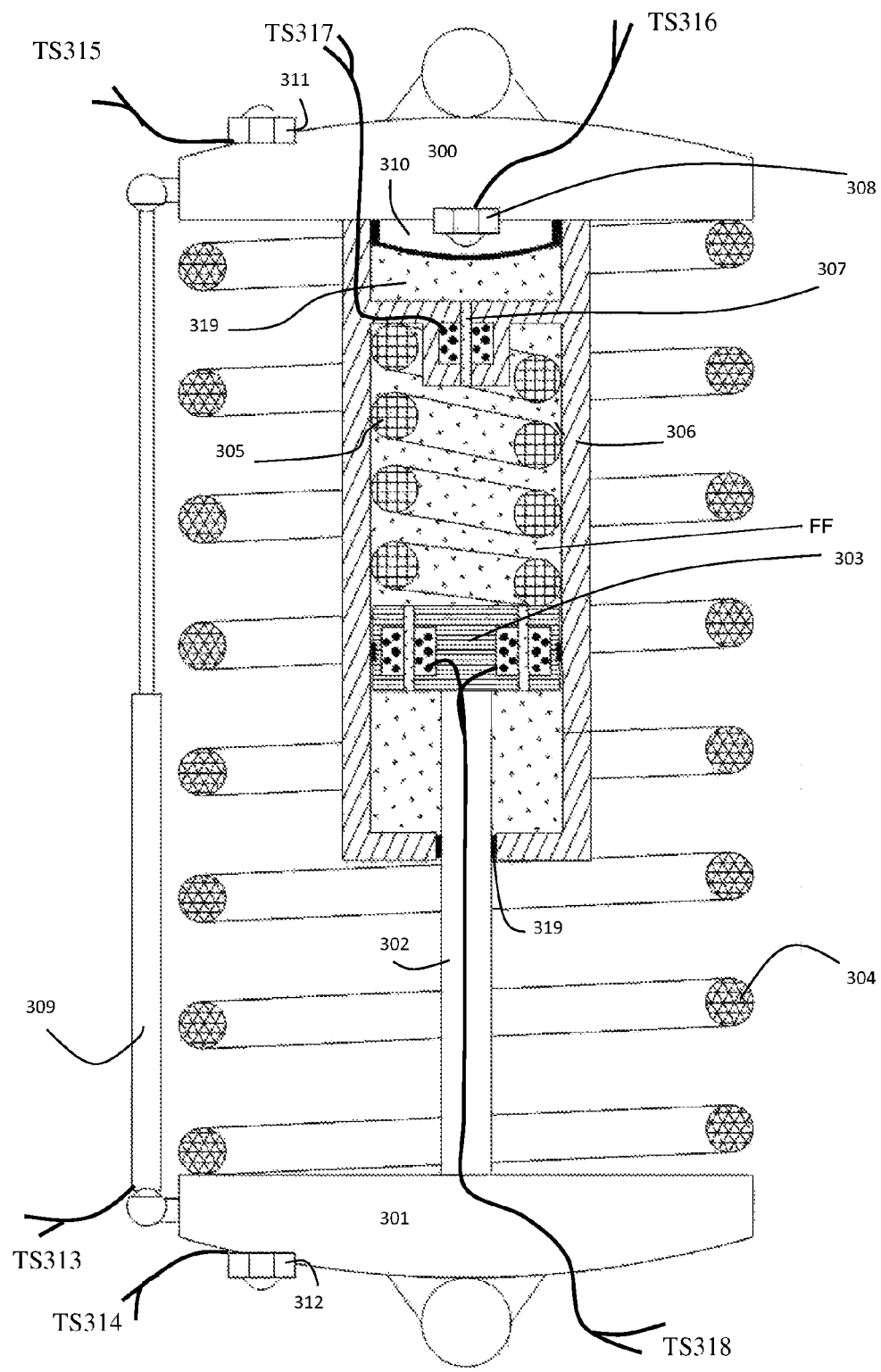
FIG. 10 depicts an axial section of a first embodiment of an element of the suspension in FIG. 9.
Figure 11:
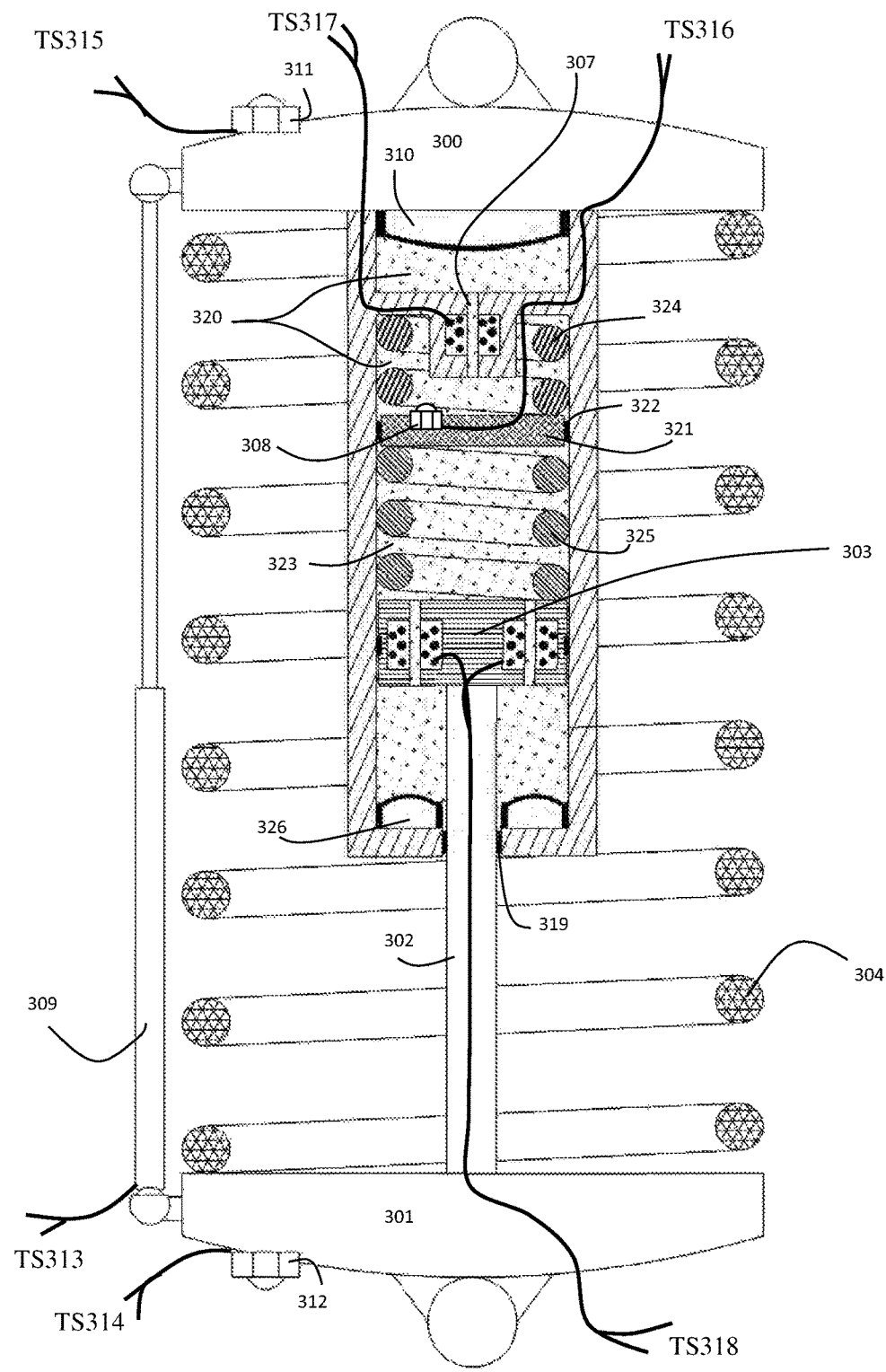
FIG. 11 depicts an axial section of a second embodiment of an element of the suspension in FIG. 9.

The further embodiment of the suspension strut depicted in FIG. 11 refers again to the scheme C described in FIG. 9 and the elements in FIG. 11 similar to those in FIG. 10 have the same reference numerals, with some differences. The coil spring 305 in FIG. 10 is here divided into two parts, the lower part 325 and the upper part 324. This because in the chamber in which the piston 303 slides there is a slidable element 321 which separates the ferrofluid into two portions. In such a configuration, 321 represents the intermediate body SI and is connected to sensor 308 with the electrical terminals TS316 exiting the suspension. The ferrofluid is thus divided into the upper fluid part 320 related to the first damper and the lower part 323 related to the second damper. The upper part of 324 is connected to the upper support 300 at an end, and to 321 at the other end.

Instead, the lower part, i.e. 325, is connected at the top to the intermediate body SI and at the bottom to piston 303, 322 represents a scaling element to keep the two ferrofluid-containing chambers separated, 326 is a pressurized elastic chamber.

Figure 12:
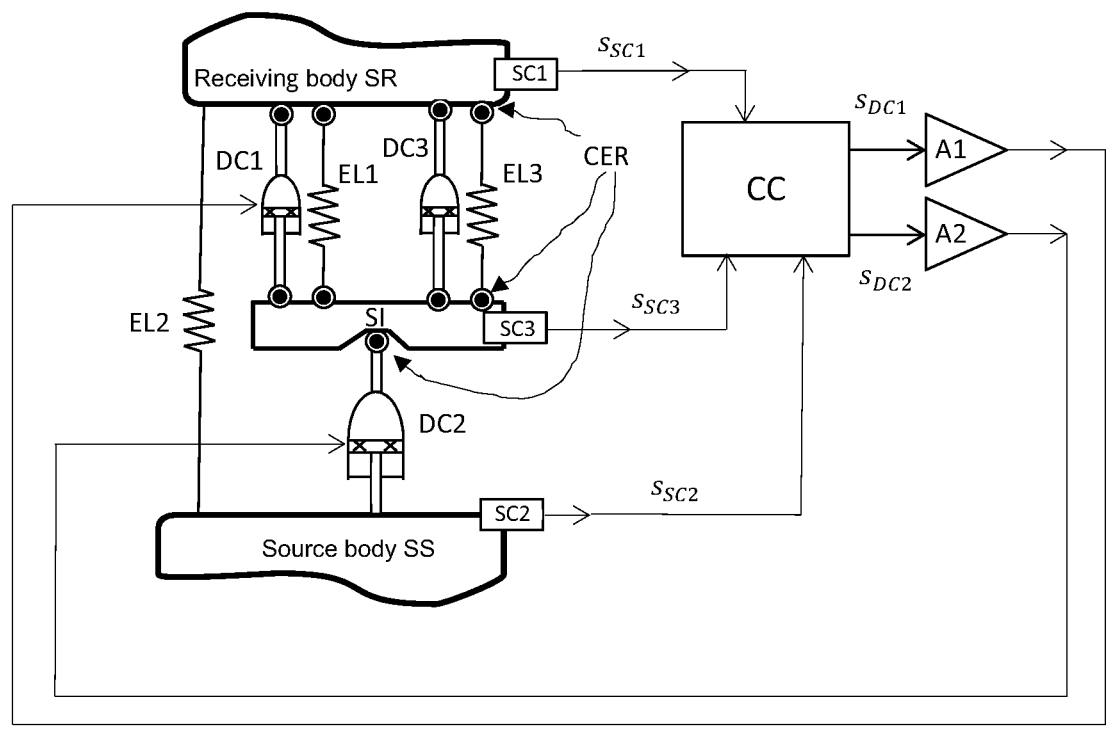
FIG. 12 depicts a scheme of a fourth embodiment of the suspension of the invention with control system (scheme D)
Figure 13:
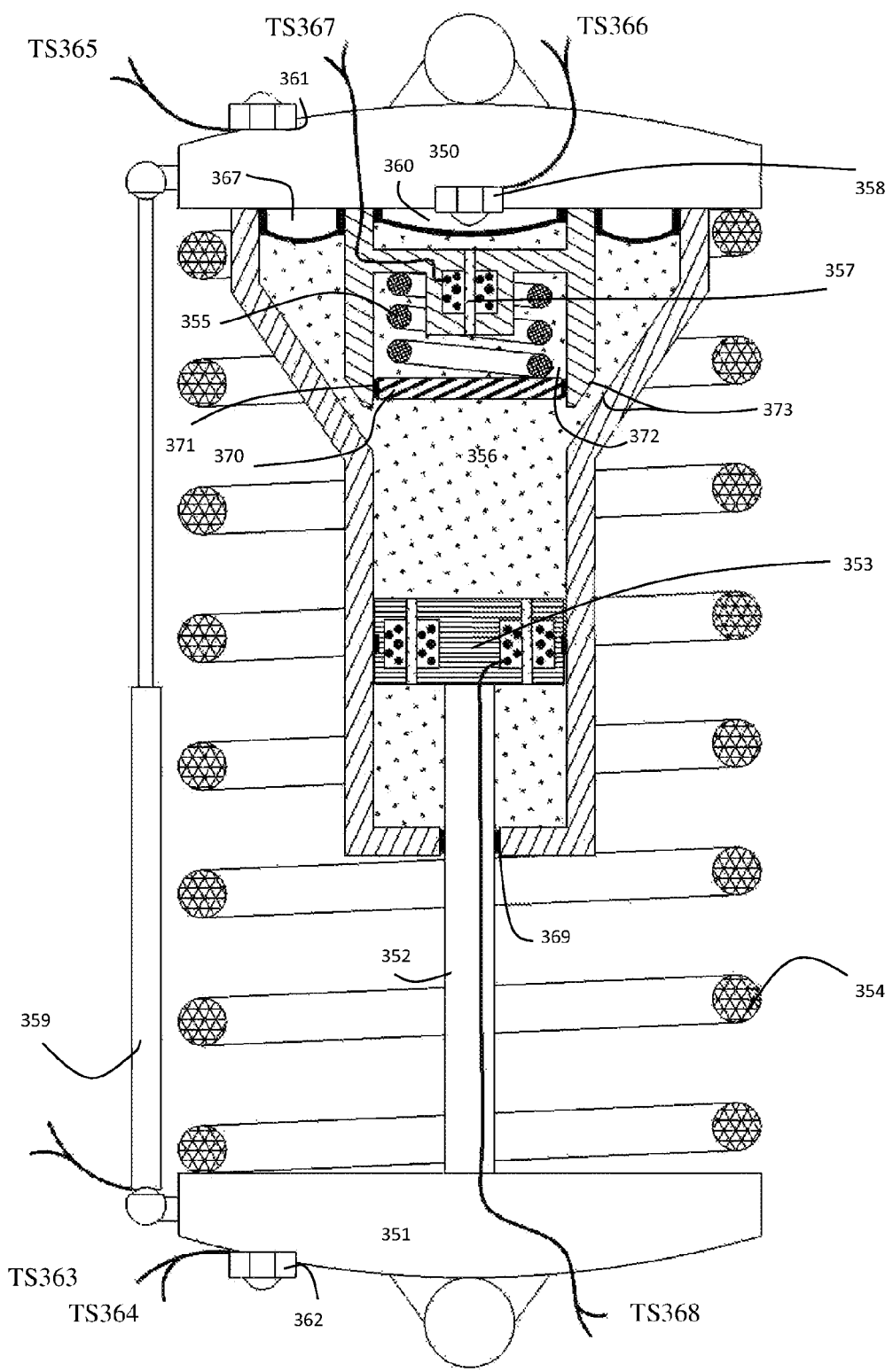
FIG. 13 depicts an axial section of a first embodiment of an element of the suspension in FIG. 12.

The embodiment of the suspension strut in FIG. 13 refers to the scheme D described in FIG. 12. Also in this strut variant, the piston 353 and the orifice with windings 357 are similar to the piston in FIG. 22. The upper support 350 can be the receiving body SR, or alternatively the source body SS according to the suspension arrangement, and it is connected to elastic element 355 and elastic element 354. The element 354 is connected between the upper support 350 and the lower support 351. The source body 351 is in turn rigidly connected to the stem 352 connected to the piston 353 which slides inside the ferrofluid-containing chamber 356. The ferrofluid 356 can pass through an outer chamber, while crossing a narrow side conduit 373, thus dissipating energy due to the presence of a narrowing and depicted in the scheme D in FIG. 12 as dissipater DC3, and can displace the slidable element 370 representing the intermediate body SI. The slidable element 370 divides the ferrofluid into two parts by means of the scaling elements 371, the lower part 356 and the upper part 372. By sliding through orifice 357, the ferrofluid 372 represents the controlled dissipater DC1. The element 369 is a sealing gasket which allows stem 352 to slide, thus preventing the ferrofluid from leaking outside the chamber. Sensor SC1 is connected to 361, sensor SC2 is connected to 362 and sensor SC3 is connected to 358 and to the linear potentiometer 359, all connected to the unit CC by means of the electric connections TS365, TS364, TS366, TS363. The sensors SC1 and SC2 can be, for example, accelerometers, whereas SC3 is a pressure sensor measuring the pressure of chamber 356, so that the physical parameters of interest of the intermediate body SI represented by the slidable element 370 are measured. The physical parameters of the intermediate body 370 can obviously be obtained with the aid, for example, of a suitably isolated second potentiometer mounted inside chamber 372. A further possible Intervention for controlling the damping at narrowing 373 by means of an active control of the damping is included in the present invention. In such a case, dissipater DC3 becomes a third active, controlled dissipater.

Figure 14:
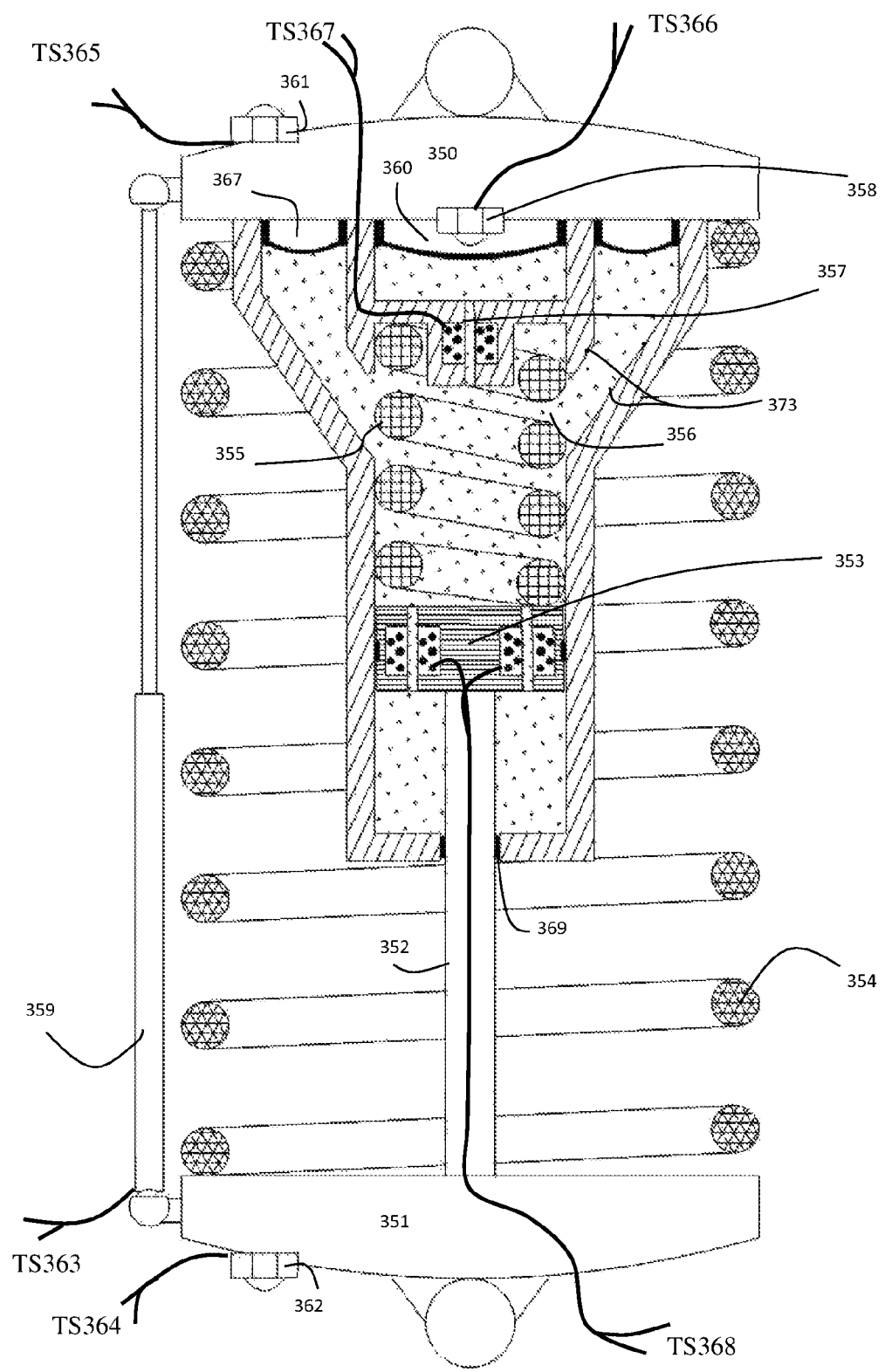
FIG. 14 depicts an axial section of a second embodiment of an element of the suspension in FIG. 12.
Figure 15:
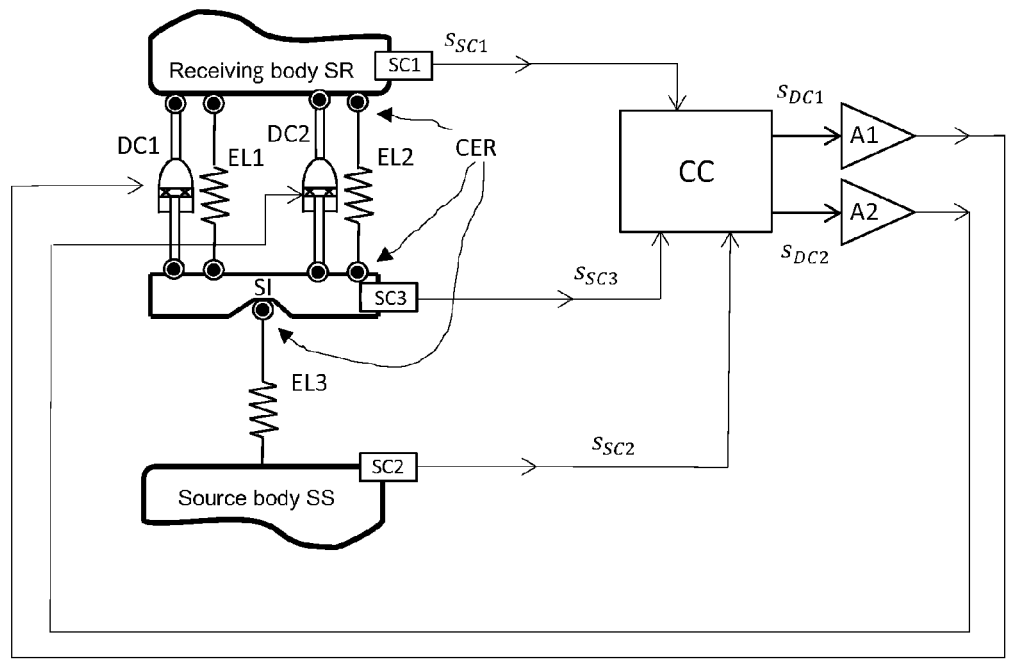
FIG. 15 depicts a scheme of a fifth embodiment of the suspension of the invention with control system (scheme E)

The embodiment of the suspension strut depicted in FIG. 14 refers again to the scheme D described in FIG. 12. Also in this strut variant, the piston 353 and the orifice with windings 357 are similar to the piston in FIG. 22. The upper support 350 can be the receiving body SR, or alternatively the source body SS, and is connected to elastic element 355 and elastic element 354. Element 354, corresponding to the elastic element EL2 in FIG. 12, is connected between receiving body 350 and source body 351. The source body 351, in turn, is rigidly connected to the stem 352 connected to the piston 353 which slides inside the ferrofluid-containing chamber 356. In this variant, the ferrofluid 356 corresponds to the tilting intermediate system SI in FIG. 12. The ferrofluid 356 can either pass through an outer chamber while crossing a narrow side conduit 373 thus dissipating energy, depicted in the scheme D in FIG. 12 as a passive dissipater DC3, or it can pass through the orifice 357 which represents the controlled dissipater DC1. In this configuration, piston 353 is directly connected to the coil-shaped elastic element 355, represented by the elastic element EL2 in FIG. 12, which in turn is connected to the receiving body 350. The elastic elements 367 and 360 are elastic elements with pressurized gas therein and represent the elastic elements EL3 and EL1, respectively, shown in FIG. 12. Element 369 is a sealing gasket which allows the stem 352 to slide without causing the ferrofluid to leak outside the chamber. Sensor SC1 is associated with 361, sensor SC2 is associated with 362, and sensor SC3 is associated with 358 and the linear potentiometer 359, all connected to the control unit CC by means of the electric connections TS365, TS364, TS366, TS363, SC1 and SC2 can be, for example, accelerometers, SC3 is a pressure sensor measuring the pressure of chamber 356, so that the physical parameters of interest of the Intermediate body SI represented by the ferrofluid are measured. A further possible intervention for controlling the damping close to narrowing 373, again by means of an active control damping, is included in the present invention; thereby, the third dissipater DC3 is an active, controlled dissipater.

Figure 16:
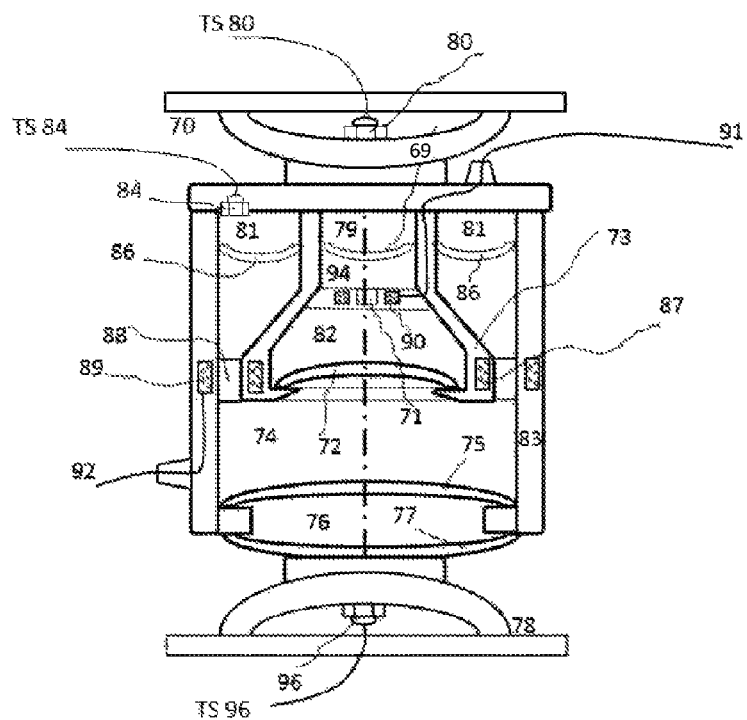
FIG. 16 depicts an axial section of a first embodiment of an element of the suspension in FIG. 15.

The embodiment of the suspension strut depicted in FIG. 16 refers again to scheme E. In this strut variant, orifices 71, 87, 88 are similar to the piston in FIG. 22. The receiving body 70 can alternately act as the source body SS. Support 77 is connected to the elastic element EL3 by means of the rigid chamber 83 containing the ferrofluid 74. The ferrofluid 74 represents the intermediate system SI. The source body 78 is connected to the lower elastic membrane 77 which, by means of the gap 76 filled with oil, transmits the motion to an upper elastic membrane 75. The three elastic elements 77, 76, 75 represent the elastic system EL3. Chamber 74 contains ferrofluid which can flow into an outer chamber by means of the orifices 88 and 87. The ferrofluid passing through the orifices 88 and 87 forms the controlled dissipater DC1. The windings of dissipater DC1 are indicated by the reference numeral 89, the electrical terminals TM and TC for the connection to the windings of dissipater DC1 are indicated by the reference numeral 92. The elastic element 72 is an elastic element corresponding to EL2 which divides the two ferrofluid-containing chambers 74, 82. The ferrofluid flowing in the upper chamber 94 necessarily passes through orifice 71 which, by virtue of its electric windings 90, can vary the damping. Such a controlled damping forms the constructional implementation of dissipater DC2. Sensor SC1 is associated with 80 being integral with support 70, sensor SC2 is integral with source body 78, and sensor SC3 with 84, which is a pressure sensor measuring the pressure of the chamber 81 and 79 so that the physical parameters of interest of the intermediate body SI represented by the ferrofluid in this embodiment are measured. All the sensors are connected to the unit CC by means of the electric connections TS80, TS84, TS96. Sensors SC1 and SC2 can be accelerometers, for example. The electrical terminals for the connection of the controlled dissipater DC2 are represented by reference numeral 91. The chambers 81, 79, 81 contain pressurized air and the elastic membranes 84, 86 and 69 correspond to EL1 and EL2, which blast pressurized air from the ferrofluid.

Figure 18:
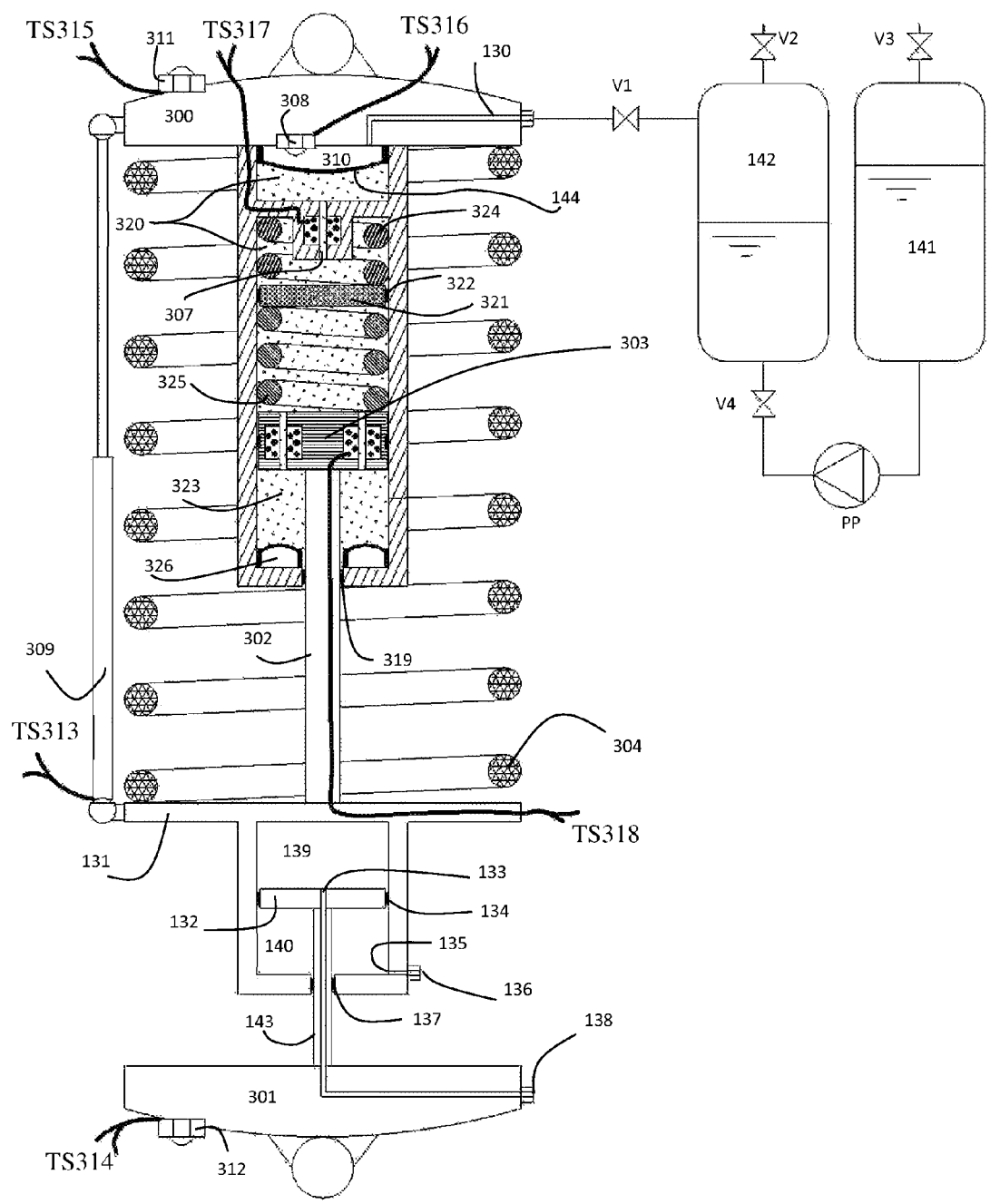
FIG. 18 depicts an axial section of a first embodiment of an element of the suspension in FIG. 17.

The embodiment of the suspension strut depicted in FIG. 18 relates to the scheme F described in FIG. 17. Such an embodiment is similar to the embodiment in FIG. 11, except for the addition of two systems, the first being an air spring RV formed by the elements with reference numerals 144, 310, 130, 142 141, V1, V2, V3, V4, PP, and the second being a device 139, 140, 143, 132 with adjustment lines 133 e 135 for the almost static adjustment of the suspension height.

In this variant of the suspension strut, piston 303 and orifice 307 are elements similar to the piston in FIG. 22. Body 300 can be the receiving body SR, or alternatively the source body SS. The receiving body 300 is connected both to the elastic element consisting of the two springs 325 and 324 in series, and to the second elastic element 304.

The coil spring corresponding to the elastic element EL1 is divided into two parts, the lower part 325 and the upper part 324; this is due to the fact that the ferrofluid-containing chamber is divided into two parts (the upper part 320 and the lower part 323) by means of a slidable element 321 with sealing elements 322. In such a configuration, 321 represents the intermediate body SI. The ferrofluid is thus divided into the upper fluid part 320 related to dissipater DC1, and the lower part 323 related to dissipater DC2. The upper part of the elastic element 324 is connected to the receiving body 300 at an end, and to the intermediate body 321 corresponding to the intermediate body SI at the other end. Instead, the lower part 325 of the elastic element EL1 is connected at the top to the intermediate body SI and at the bottom to the piston 303, 326 is a pressurized elastic chamber. Piston 303 corresponds to the controlled dissipater DC2 described in FIG. 22 and is connected to stem 302. Stem 302 is connected in turn to support 131. The slidable element 321, during the motion thereof, forces the fluid to pass inside the orifices 307 corresponding to the controlled dissipater DC1, as described in FIG. 22. In this case, the windings CS and the orifice 307 are stationary, and the fluid moves instead. Piston 303 has the electrical terminals TS318 connected to the winding CS and exiting the system 131. The windings of dissipater DC1 surrounding the orifice 307 are connected by means of the electrical terminals TS317. Both TS317 and TS318 are controlled by the control unit CC which, by means of an amplifier, modulates the current circulating in the windings CS. The coil spring 304 is directly connected between the two supports 300 and 131. The elastic membrane 310 has a pressurized gas therein, which is adjusted by the control unit CC and which controls and drives the valves V1, V2, V4 and pump PP of an external circuit. Such a circuit consists of a pressurized gas 142 and a fluid 141. Valve V3 helps to fill 141. Reservoir 141 is kept at atmospheric pressure. Pump PP displaces fluid from reservoir 141 to 142, thus varying the volume of the gas contained in 142; therefore, the volume of the gas in chamber 310 is changed through the conduit 130. Such a volume change produces a change in the elastic stiffness produced by the deformation of membrane 144 when the amount of fluid contained in the upper part of chamber 320 varies. Therefore, chamber 310 is separated from the ferrofluid by virtue of the elastic membrane 144, and it is provided with a pressure sensor 308 with electrical terminals TS316. Element 131 is connected to a movable piston system for adjusting the distance between 301 and 131. The upper chamber C 139 is connected to the line 133 up to the external connector 138, whereas chamber D is connected to the line Lo through the channel 135. Piston 132 with the sealing elements 134 is arranged between the chambers 139 and 140. Piston 132 is connected to the stem 143 which is connected in turn to the lower outer support of suspension 301. Lines La and Lo help to adjust the height by means of an external circuit with valves Va and Vo and pump, as shown in the scheme F in FIG. 17, all controlled by the control unit CC. Element 319 is a sealing element which prevents the ferrofluid from leaking outside the chamber. The sensors can be of various types according to the desired control law. Sensor SC1 is associated with 311, sensor SC2 is associated with 312, and sensor SC3 is associated with 308 and the linear potentiometer 309, all connected to the control unit CC by means of the electric connections TS315, TS316, TS313, TS314. Sensors SC1 and SC2 can be accelerometers, for example.

Figure 20:
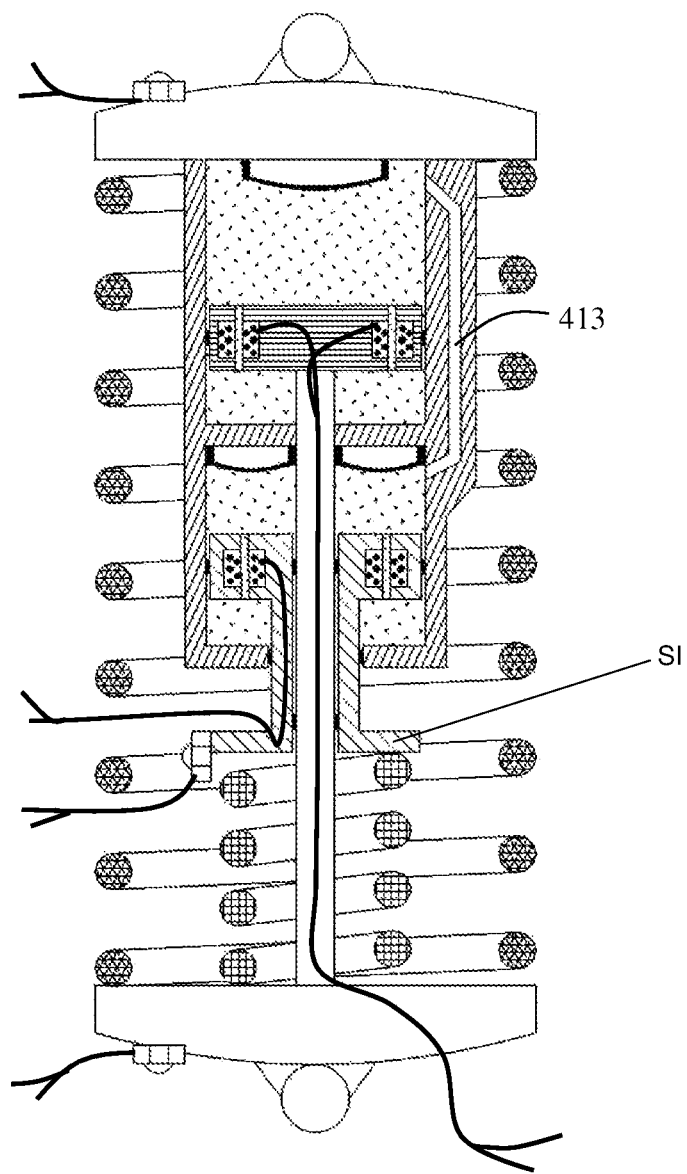
FIG. 20 depicts an axial section of a first embodiment of an element of the suspension in FIG. 19.
Figure 21:
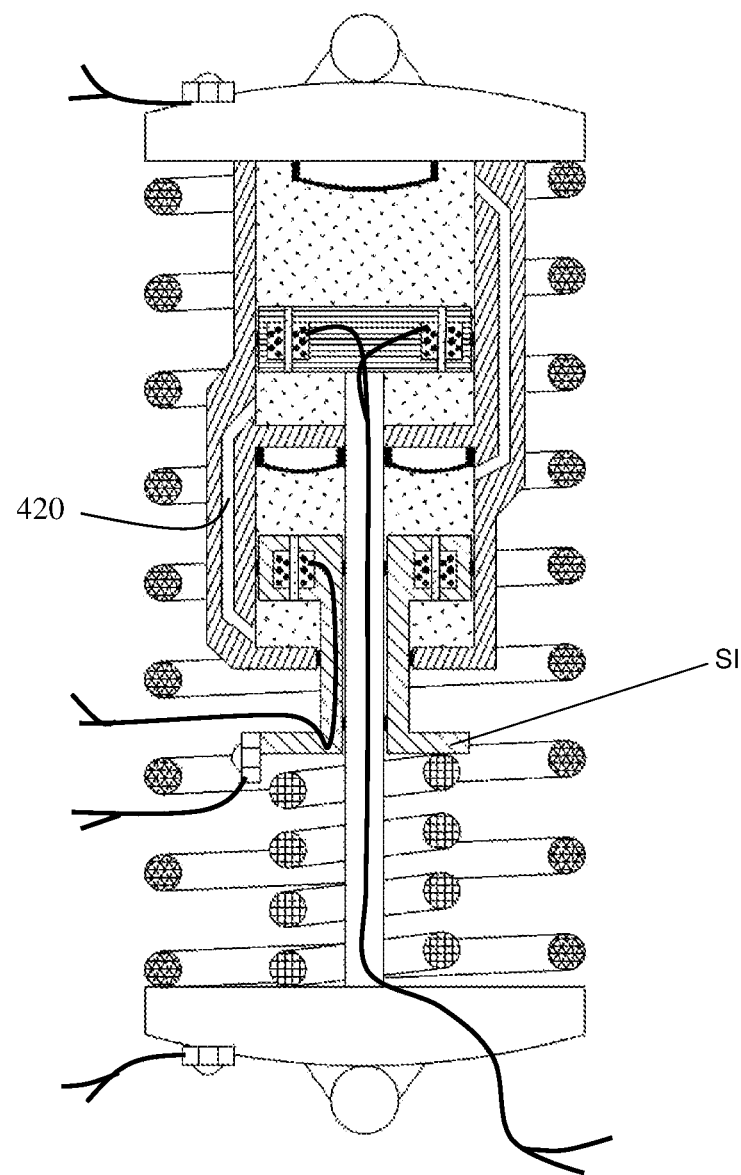
FIG. 21 depicts an axial section of a second embodiment of an element of the suspension in FIG. 19.

The embodiments in FIGS. 20 and 21 refer to the scheme G in FIG. 19. They are both similar to the preferred embodiments in FIGS. 4 and 5, except for the presence of an auxiliary conduit 413 for the embodiment in FIG. 20, and for the two auxiliary conduits 413 and 420 for the embodiment in FIG. 21. Such auxiliary conduits connect the two ferrofluid-containing chambers via a narrowing and obtain a damping effect (which can be optionally adjustable) depicted in the scheme in FIG. 19 as dissipater DC3. A further possible damping control in the auxiliary channels 413 and 420 is included in this variant, by means of the magnetorheological technique shown in other embodiments of the invention, which also makes the dissipater DC3 adjustable.

Figure 40:
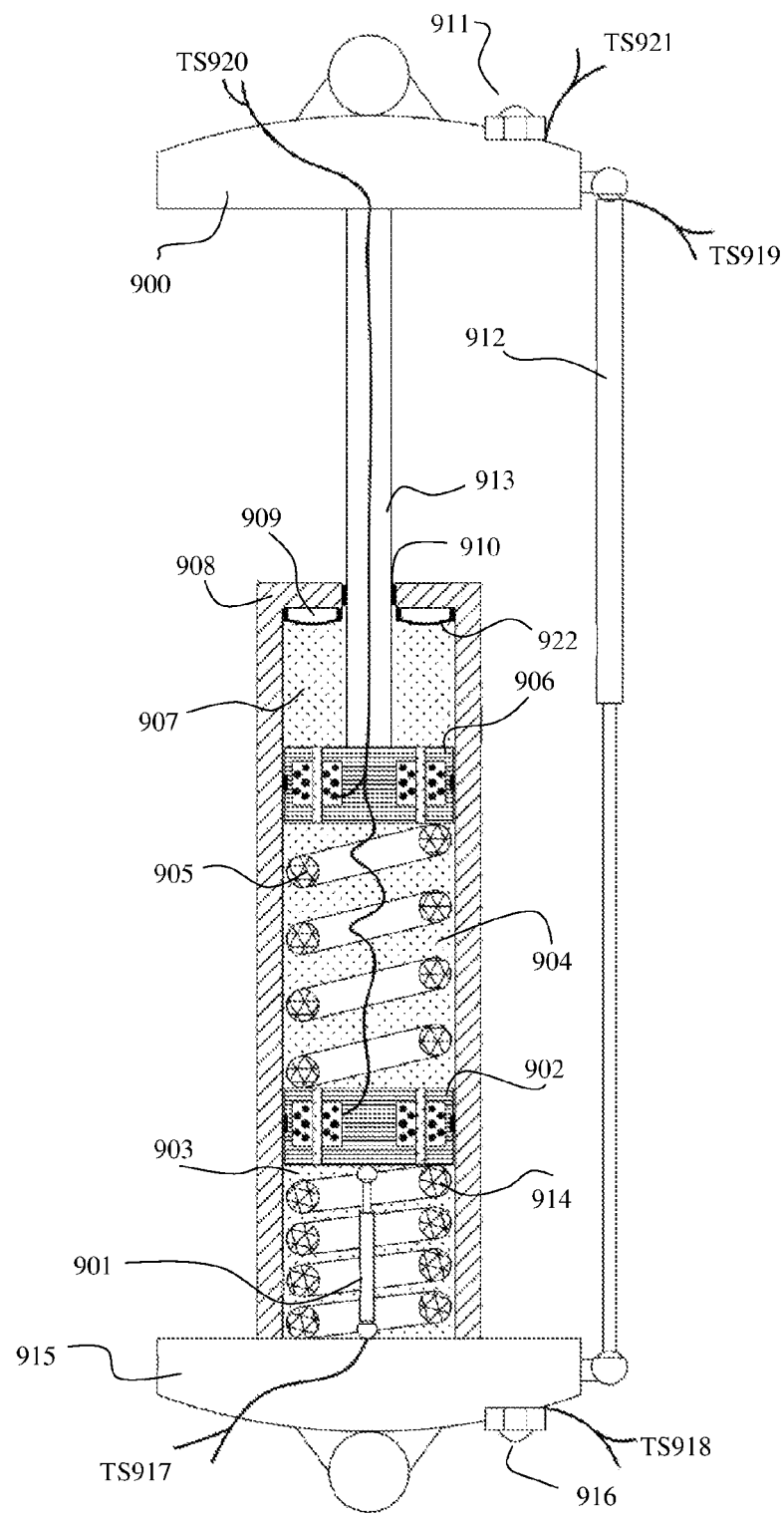
FIG. 40 depicts an axial section of a second embodiment of an element of the suspension in FIG. 6.

All the described embodiments have the shared feature of minimizing the size of the suspension; therefore, following the structure of the schemes A, B, C, D, E, F, G, H, said embodiments of the suspension provide for housing all the main components EL1, EL2, DC1, DC2, SI, present in all the embodiments, into a compact-sized device. In particular, all the preferred embodiments house the components EL1, EL2, DC1, DC2, SI inside a single device having the outer structure and dimensions completely similar to those of a damper of the prior art. In the preferred embodiments of the suspension struts, shown in FIGS. 4, 5, 7, 8, 10, 11, 13, 14, 18, 20, 21, 29, 35, 36, the struts have a cylindrical symmetry and can comprise an outer elastic element having a coil spring (or two coil springs in series, as in the case shown in FIGS. 7 and 8, or a spring consisting of a peripheral wall which can be elastically deformed, as in the case shown in FIG. 29) and controllable dissipaters and further elastic elements mounted coaxially to and inside the outer coil spring. The preferred embodiment in FIG. 40 has a cylindrical symmetry, and all the elastic elements and controllable dissipater elements are mounted coaxially and contained in a single closed chamber.

An example of applying an embodiment among those described in the preferred applications to a suspension with articulated-quadrilateral arms of a road vehicle is shown in FIGS. 30, 31, 32, 33, in which the source body SS, the receiving body SR, the lower suspension arm BRI and the upper suspension arm BRS are shown. In this particular application, SR is the vehicle chassis, SS represents a wheel, BRI and BRS are connected to the wheel SS by means of hinges. BRI is connected to the lower suspension part. As noted, in this case the damping device is unique, and it comes with external and size features completely similar to those of a conventional device. EL2 is the elastic element placed between SR and BRI, whereas EL1 is the elastic element placed between intermediate body SI and BRI. DC1 represents the controlled damper connected to EL1 and SR, whereas DC2 represents the controlled damper connected between BRI and SR.

Figure 32:
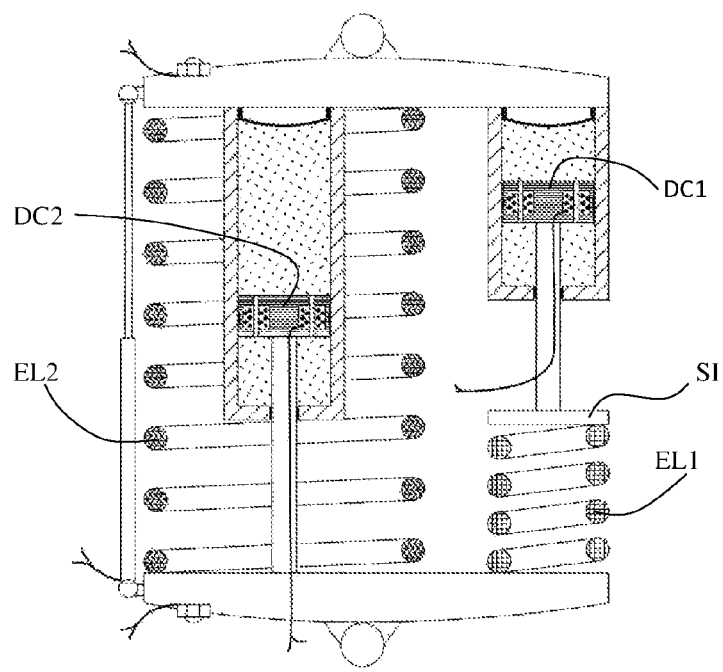
FIG. 32 depicts an axial section of a fourth embodiment of an element of the suspension in FIG. 1.
Figure 33:
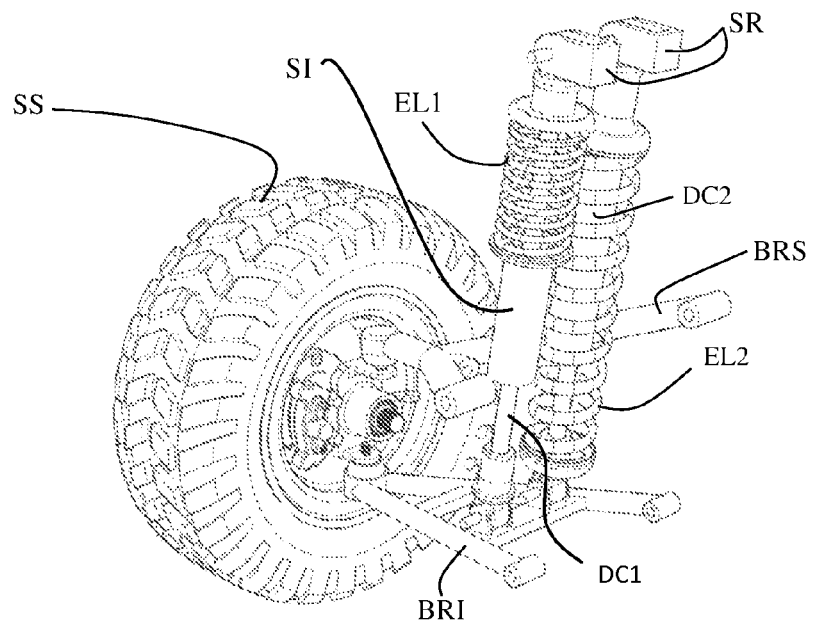
FIG. 33 depicts a particular application of the embodiment of the suspension in FIG. 32 on a road vehicle wheel.

The schemes A, B, C, D, E, F, G H of the suspension of the invention can also be obtained by combining simpler elements, implementing the connection methods A, B, C, D, E, F, G, H, through solutions which house the components EL1, EL2, DC1, DC2, S1 in mechanical devices which are separated and connected together by suitable kinematic elements which form part of the kinematic mechanism of the suspension. In particular, in all the schemes A, B, C, D, E, F, G, H, there are elastic elements and controllable dissipaters which are connected together either in series or in parallel. Therefore, each connection method A, B, C, D, E, F, G, H, can be carried out by combinations of two distinct devices, such as that shown in FIG. 32, the first connecting the spring and the controllable dissipater in series, and the second in parallel. An example of applying this constructional type of the connection method according to scheme A, which uses two separate mechanical devices, as shown in FIG. 32, is depicted in FIG. 33, for an articulated-quadrilateral suspension of a road vehicle.

Figure 34:
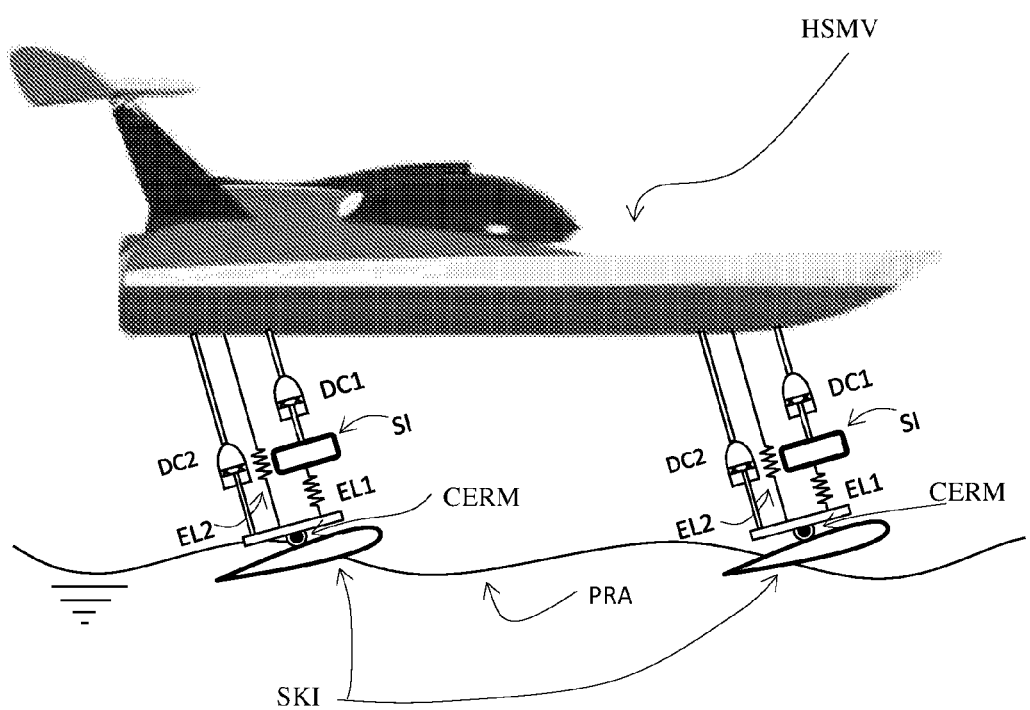
FIG. 34 depicts a particular application of the suspension of the invention on a marine vehicle.

A further example of applying the suspension of the invention to the case of a high-speed marine vehicle is shown in FIG. 34. High-speed marine vehicles face major difficulties during navigation due to impacts of the hull HSMV onto the water surface PRA, especially in the presence of waves. The system suggested in the present invention helps to mitigate the effect of such impacts, resulting in the double benefit of (i) protecting the hull structures and any occupants against too high forces, (ii) keeping a better attitude of the watercraft, in terms of pitch, roll, and yaw motions.

The hull HSMV is connected by means of two suspension systems, for example, according to the connection method A, to two strakes SKI which are in contact with the water surface PRA. The strakes are then articulated with respect to the suspension structure through the motorized hinges CERM, which allow the inclination angle of the strakes SKI to be modified with respect to the axis of the vehicle. In this application, the source body SS is the strake SKI, the receiving body SR is the hull HSMV.

The embodiment of the suspension strut depicted in FIG. 40 refers again to the scheme B described in FIG. 6. Also in this strut variant, the pistons 906 and 902 are similar to the piston in FIG. 22. The receiving body SR or alternatively the source body SS is indicated by reference numeral 900. The receiving body SR or alternatively the source body SS, if the arrangement of the suspension is inverted, is indicated by reference numeral 915. The outer chamber 908 encloses the ferrofluid-containing chambers 907, 904 and 903, the two pistons 906 and 902, and the elastic elements 905 and 914 therein. The two pistons 906 and 902 represent the dissipaters DC2 and DC1, respectively, described in detail in FIG. 6. The two elastic elements 905 and 914 represent the elastic elements EL2 and EL1, respectively, described in detail in FIG. 6. Piston 902, in addition to behave as a controlled dissipater and since it is a floating body, also represents in this solution the intermediate body SI related to FIG. 6. Stem 913 is connected to 900 and to piston 906. Piston 906 is connected to the elastic element 905, in turn connected to the floating piston 902. Piston 902 is connected to the elastic element 914, the latter being connected to the lower support 915. The ferrofluid-containing chambers 907, 904, 903 communicate with one another by virtue of the orifices of pistons 906 and 902 which slide therein. The elastic membranes containing pressurized gas are indicated by reference numerals 922 and 909.910 is a sealing element which prevents the ferrofluid from leaking outside chamber 908. The sensors can be of various types according to the desired control law. Sensor SC1 is associated with 911 connected to 900, sensor SC2 is associated with 916 connected to 915. The linear potentiometer 912 is connected between 900 and 915, and the potentiometer 901 is connected between 902 and 915. Such sensors are connected to the control unit CC by means of the electrical terminals TS921, TS918, TS919 and TS917. The sensors SC1, SC2 and SC3 can be accelerometers, for example. The electrical terminals TS920 represent the connections related to the pistons 906 and 902.

The invention claimed is:

1. A suspension adapted to damp the vibrations generated by a vibrating source body on a receiving body, comprising:
    a first energy dissipation system comprising at least one first energy dissipater with controllable dissipation force and at least one first elastic element,
    a second energy dissipation system comprising at least one second energy dissipater with controllable dissipation force and at least one second elastic element,
    at least one intermediate body,
    an electronic control device,
    at least one first sensor which can be associated to the receiving body, at least one second sensor which can be associated to the source body and at least one third sensor associated to the at least one intermediate body, to detect instantaneous physical parameters of source body, of receiving body and of the least one intermediate body, wherein the electronic control device can be operated as a function of a control strategy which takes said instantaneous physical parameters into account to control the damping forces of said first and second energy dissipation systems in a combined manner, wherein the at least one first and the at least one second energy dissipaters, the at least one first elastic element and the at least one second elastic element are connected between source body and/or receiving body and/or the at least one intermediate body so that only the adjustment of the damping forces generated by said at least one first and at least one second energy dissipaters modifies:

the static stiffness of the suspension itself, the transmission curve of the suspension by varying both the peak frequencies and the associated amplitude, the instantaneous elastic forces produced by the at least one first and second elastic element, in order to optimize the motion features of the receiving body, wherein the receiving body is an upper part, the source body is a lower part, wherein the at least one first energy dissipater is connected between the upper part and the at least one intermediate body, the at least one second energy dissipater is connected between the at least one intermediate body and the lower part, the at least one first elastic element is connected between the upper part and the lower part, and the at least one second elastic element is connected between the upper part and the at least one intermediate body.

2. The suspension according to claim 1, wherein the at least one first energy dissipater is connected to the upper part by a first hinge and to the least one intermediate body by a second hinge, the at least one second energy dissipater is connected to the at least one intermediate body by a third hinge, and the at least one second elastic element is connected to the at least one intermediate body by a fourth hinge and to the upper part by a fifth hinge.

3. The suspension according to claim 1, wherein the at least one first sensor, second sensor and third sensor are adapted to detect absolute position, relative position with respect to the other bodies, absolute speed, relative speed with respect to the other bodies, absolute acceleration and relative acceleration with respect to the other bodies, and/or further instantaneous physical parameters of the intermediate body.

4. The suspension according to claim 3, wherein the intermediate body is a fluid or gas and the instantaneous physical parameters to be measured are pressure and/or flow rate.

5. The suspension according to claim 4, wherein the sensors are integral with the source body, the receiving body the intermediate body and/or other parts of the suspension, respectively.

6. The suspension according to claim 1, wherein the energy dissipaters comprise a magnetorheological and/or electrorheological fluid, and wherein the damping force is adjusted by the electronic device by controlling the currents and/or voltages generating the electromagnetic and/or electrostatic field which energizes said magnetorheological and/or electrorheological fluid.

7. The suspension according to claim 1, wherein the energy dissipaters comprise means in which the damping force is adjusted by the electronic control device by controlling servo-valves, adjusting their degree of opening.

8. The suspension according to claim 1, wherein the energy dissipaters comprise means in which the damping force is adjusted by the electronic control device by controlling the sliding of friction surfaces, modifying the contact pressure between said surfaces.

9. The suspension according to claim 1, wherein the dissipaters comprise means in which the damping force is adjusted by the electronic control device by controlling electric resistors inside an electric circuit coupled to the mechanical members of the suspension through electromagnetic and/or electrostatic type effects, thus determining the degree of such a coupling by delivering of predetermined currents and/or voltages.

10. The suspension according to claim 1, wherein the source body is a vehicle wheel or a watercraft strake and the receiving body is the vehicle passenger compartment or a watercraft hull and/or any part of the outfit thereof.

11. The suspension according to claim 1, wherein the source body is an aircraft landing gear and the receiving body is an aircraft fuselage.

12. The suspension according to claim 1, wherein the source body is a machinery base and the receiving body the machinery itself.

13. The suspension according to claim 1, wherein the source body is a machinery and the receiving body is the base.

14. The suspension according to claim 1, wherein the source body is a part of any structure and the receiving body is a second part of said structure.

15. A method of controlling the features of the suspension according to claim 1, comprising the stages of:

detecting predetermined physical parameters by means of sensors, sending signals corresponding to said physical parameters to the control unit, calculating the values of at least two control signals to be sent to amplifiers by means of an algorithm which includes examining said signals, and calculating the best combination of the adjustment signals $S_{DC1}$, $S_{DC2}$ of the dissipater elements chosen from the following combinations:

| | |
|---|---|
| Combination 1: | $C_{DC1}$ → minimum value |
| | $C_{DC2}$ → minimum value |
| Combination 2: | $C_{DC1}$ → minimum value |
| | $C_{DC2}$ → maximum value |
| Combination 3: | $C_{DC1}$ → maximum value |
| | $C_{DC2}$ → minimum value |
| Combination 4: | $C_{DC1}$ → maximum value |
| | $C_{DC2}$ → maximum value | where $C_{DC1}$ is the damping coefficient of the first dissipater element and $C_{DC2}$ is the damping coefficient of the second dissipater element, to minimize or maximize the absolute and/or relative acceleration and/or speed and/or position of the receiving system.

16. The method according to claim 15, wherein said algorithm includes calculating the product of the speed of the receiving system $V_{SR}$ multiplied by the relative speed $V_{SR} - V_{SS}$ and if such product is greater than or equal to zero, the control unit adjusts the first dissipating element with the maximum damping value $C_{DC1}$ thereof, and the second dissipating element with the minimum damping value $C_{DC2}$ thereof, and if said product is lower than zero, the control unit adjusts the first dissipating element with the minimum damping value $C_{DC1}$ thereof, and the second dissipating element with the maximum damping value $C_{DC2}$ thereof.

* * * * *